(12) United States Patent  
Zhang et al.

(10) Patent No.: US 12,259,297 B2
(45) Date of Patent: Mar. 25, 2025

(54) METHOD FOR BOX LEAK DETECTION AND LEAK DETECTION SYSTEM

(71) Applicant: CONTEMPORARY AMPEREX TECHNOLOGY (HONG KONG) LIMITED, Hong Kong (CN)

(72) Inventors: Ning Zhang, Fujian (CN); Dengwei Lian, Fujian (CN); Bin Zhao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/122,792

(22) Filed: Mar. 17, 2023

(65) Prior Publication Data

US 2023/0221205 A1    Jul. 13, 2023

Related U.S. Application Data

(63) Continuation of application No. PCT/CN2022/081242, filed on Mar. 16, 2022.

(30) Foreign Application Priority Data

Apr. 30, 2021    (CN) .................. 202110488231.1

(51) Int. Cl.
*G01M 3/22* (2006.01)
*G01M 3/20* (2006.01)
*G01M 3/32* (2006.01)

(52) U.S. Cl.
CPC ............ *G01M 3/226* (2013.01); *G01M 3/202* (2013.01); *G01M 3/207* (2013.01); *G01M 3/32* (2013.01)

(58) Field of Classification Search
None
See application file for complete search history.

(56) References Cited

U.S. PATENT DOCUMENTS

| 6,289,722 B1 | 9/2001 | Lycan et al. |
| 2006/0090546 A1* | 5/2006 | McCoy ................. G01M 3/226 73/40.7 |

(Continued)

FOREIGN PATENT DOCUMENTS

| CN | 205067031 U | 3/2016 |
| CN | 105987796 A | 10/2016 |

(Continued)

OTHER PUBLICATIONS

"European Standard EN ISO 20485—'Non-destructive testing—Leak testing—Tracer gas method (ISO 20485:2017)'", European Committee for Standardization, Feb. 2018, 23 pages.

(Continued)

*Primary Examiner* — Patrick Assouad
*Assistant Examiner* — Mark A Shabman
(74) *Attorney, Agent, or Firm* — Kilpatrick Townsend & Stockton LLP

(57) ABSTRACT

This application provides a method for box leak detection and a leak detection system, and relates to the field of leak detection technologies. The method for box leak detection may include: filling a box under test with a tracer gas, where the box under test has a plurality of positions under test; and measuring a leak rate at each position under test. Leak detection may be performed on each position under test of the box under test. In this way, not only a specific leak position can be determined, so that leak-proof treatment may be subsequently performed on the leak position in a targeted manner, but also the leak rate at each position under test can be measured, providing a basis for a level of to-be-taken (Continued)

leak-proof measures and whether to take leak-proof measures, thereby improving accuracy of box leak detection.

18 Claims, 16 Drawing Sheets

(56) References Cited

U.S. PATENT DOCUMENTS

| | | | |
|---|---|---|---|
| 2009/0277249 | A1 | 11/2009 | Polster et al. |
| 2012/0048001 | A1 | 3/2012 | Pawlyk |
| 2019/0302045 | A1 | 10/2019 | Uematsu et al. |
| 2020/0240868 | A1* | 7/2020 | Regef .................. G01M 3/207 |

FOREIGN PATENT DOCUMENTS

| | | |
|---|---|---|
| CN | 207215391 U | 4/2018 |
| CN | 108225685 A | 6/2018 |
| CN | 109323814 A | 2/2019 |
| CN | 109425469 A | 3/2019 |
| CN | 110426158 A | 11/2019 |
| CN | 110849560 A | 2/2020 |
| CN | 111912577 A | 11/2020 |
| CN | 112098008 A | 12/2020 |
| CN | 112213045 A | 1/2021 |
| JP | S57-169649 A | 10/1982 |
| JP | S61-108949 U | 7/1986 |
| JP | H10-281915 A | 10/1998 |
| JP | 2004340844 A | 12/2004 |
| JP | 2005-207994 A | 8/2005 |
| JP | 2008241265 A | 10/2008 |
| JP | 2010516998 A | 5/2010 |
| JP | 2012251849 A | 12/2012 |
| JP | 2018009892 A | 1/2018 |
| JP | 2018128300 A | 8/2018 |
| JP | 2020106456 A | 7/2020 |
| WO | 2018/003977 A1 | 1/2018 |

OTHER PUBLICATIONS

Office Action issued Aug. 22, 2023 in Japanese Patent Application No. 2022-558555 with English translation thereof, 14 pages.
Office Action issued Apr. 28, 2023 in Chinese Patent Application No. 202110488231.1 with English translation thereof, 10 pages.
Office Action issued Aug. 25, 2023 in Chinese Patent Application No. 202110488231.1 with English translation thereof, 10 pages.
Search Report prepared Apr. 27, 2023 in Chinese Patent Application No. 202110488231.1, 3 pages.
Extended European Search Report issued Sep. 25, 2023 in corresponding European Patent Application No. 22772398.8, 11 pages.
Japanese Decision to Grant a Patent issued Nov. 21, 2023 in corresponding Japanese Patent Application No. 2022-558555 (with machine-generated English translation), 5 pages.
International Search Report and Written Opinion mailed on Jun. 1, 2022, received for PCT Application PCT/CN2022/081242, filed on Mar. 16, 2022, 9 pages.

* cited by examiner

METHOD FOR BOX LEAK DETECTION AND LEAK DETECTION SYSTEM

CROSS-REFERENCE TO RELATED APPLICATIONS

This application is a continuation of International Application No. PCT/CN2022/081242, filed Mar. 16, 2022, which claims priority to Chinese patent application No. 202110488231.1, filed on Apr. 30, 2021 and entitled "METHOD FOR BOX LEAK DETECTION AND LEAK DETECTION SYSTEM", each of which is incorporated herein by reference in its entirety.

TECHNICAL FIELD

This application relates to the field of leak detection technologies, and specifically, to a method for box leak detection and a leak detection system.

BACKGROUND

A battery includes a box and a plurality of battery cells accommodated in the box. The box includes a plurality of parts, and a plurality of spaces for accommodating the plurality of battery cells are defined by connecting the plurality of parts. In addition, for safety performance of the battery, a pressure relief mechanism is provided on the battery box. The pressure relief mechanism is configured to release internal pressure when the internal pressure or temperature in the box reaches a threshold, thereby ensuring safety of the battery. Sealing performance of connection positions of various parts of the box and sealing performance of connection position of the pressure relief mechanism and the box have important influence on safety performance of the battery. Therefore, it is necessary to perform leak detection at the connection positions of various parts of the box and at the connection position between the pressure relief mechanism and the box to detect whether the sealing performance meets requirements. However, existing leak detection methods and leak detection tools can only obtain rough detection results, which are difficult to meet requirements of high sealing performance.

SUMMARY

Embodiments of this application provide a method for box leak detection and a leak detection system, so as to improve accuracy of a leak detection structure.

According to a first aspect, an embodiment of this application provides a method for box leak detection, including filling a box under test with a tracer gas, w % here the box under test has a plurality of positions under test; and measuring a leak rate at each position under test.

In the foregoing technical solution, leak detection is performed on each position under test of the box under test. In this way, not only a specific leak position can be determined, so that leak-proof treatment is subsequently performed on the leak position in a targeted manner, but also the leak rate at each position under test can be measured, improving accuracy of box leak detection and providing a basis for a level of to-be-taken leak-proof measures and whether to take leak-proof measures.

In some embodiments of the first aspect of this application, the method for box leak detection further includes:

measuring a concentration of the tracer gas in the box under test, and after the concentration reaches a preset range, measuring a concentration of the tracer gas at each position under test to obtain the leak rate at each position under test.

In the foregoing technical solution, after the concentration of the tracer gas in the box under test reaches the preset range, the leak rate at each position under test is measured, so that the concentration of the tracer gas in the box under test meets a detection condition, and a leak detection difference caused by a concentration difference of the tracer gas in the box under test is eliminated.

In some embodiments of the first aspect of this application, the measuring a concentration of the tracer gas in the box under test includes:

leading a gas in the box under test to a gas calibration detection apparatus, and measuring the concentration of the tracer gas in the gas in the box under test by using the gas calibration detection apparatus.

In the foregoing technical solution, after the gas in the box under test is led into the gas calibration detection apparatus, tracer gas concentration measurement is performed, helping measure the concentration of the tracer gas, and therefore a relative positional relationship between the gas calibration detection apparatus and the box under test can be more flexible.

In some embodiments of the first aspect of this application, the method for box leak detection further includes:

after the box under test is filled with the tracer gas for a predetermined period of time, obtaining the concentration of the tracer gas in the box under test, and determining whether the concentration of the tracer gas is within the preset range.

In the foregoing technical solution, after the box under test is filled with the tracer gas for the predetermined period of time, measurement of the concentration of the tracer gas in the box under test starts without the need to measure the concentration of the tracer gas in the box under test in real time or multiple times, thereby improving detection efficiency.

In some embodiments of the first aspect of this application, the method for box leak detection further includes: obtaining a calibrated leak rate at the position under test.

In the foregoing technical solution, after the calibrated leak rate at the position under test is obtained, the leak rate at the position under test is compared with a corresponding calibrated leak rate, and if the leak rate at the position under test is lower than the calibrated leak rate, a sealing design of the position under test meets requirements.

In some embodiments of the first aspect of this application, the obtaining a calibrated leak rate at the position under test includes:

leading out the gas in the box under test to the gas calibration detection apparatus through a calibration mechanism, and after the concentration of the tracer gas in the box under test reaches the preset range, obtaining the calibrated leak rate at the position under test.

In the foregoing technical solution, the gas in the box is led out to the gas calibration detection apparatus through the calibration mechanism to obtain a calibrated leak rate of the box under test, which not only facilitates obtaining the calibrated leak rate of the box under test, but also improves accuracy of the obtained calibrated leak rate.

In some embodiments of the first aspect of this application, the method for box leak detection further includes:

leading out the gas in the box under test during a process of filling the box under test with the tracer gas.

In the foregoing technical solution, the gas originally in the box under test is led out during the process of filling the box under test with the tracer gas, which can make room for the tracer gas so that the concentration of the tracer gas in the box under test can reach the preset range. In addition, filling of the tracer gas and exhausting of the gas originally in the box under test are performed at the same time, which can also accelerate diffusion of the tracer gas in the box under test.

In some embodiments of the first aspect of this application, the leading out the gas in the box under test during a process of filling the box under test with the tracer gas includes:

during a process of filling the box under test with the tracer gas from a first end of the box under test, leading out the gas in the box under test from a second end of the box under test opposite the first end.

In the foregoing technical solution, during the process of filling the box under test with the tracer gas from the first end of the box under test, the gas originally in the box under test is led out from the second end of the box under test opposite the first end, which can make room for the tracer gas so that the concentration of the tracer gas in the box under test can reach the preset range. In addition, the tracer gas is uniformly diffused in the box under test in an accelerated manner and quickly fills the entire box under test, making the tracer gas in the box under test tend to be in a single concentration.

In some embodiments of the first aspect of this application, the method for box leak detection further includes:

obtaining a pressure difference of the box under test at a first moment and a second moment to determine whether the pressure difference is beyond a preset range.

In the foregoing technical solution, when box leak detection is performed, it is necessary to maintain a specific pressure inside the box under test to meet detection requirements. In addition, if the box under test does not have a position with a large leak rate, in a specific period of time, pressure inside the box under test is within a preset range; or the pressure beyond the preset range indicates that there is a position with a large leak rate, and the box under test needs to be repaired.

In some embodiments of the first aspect of this application, the method for box leak detection further includes:

after the measuring a leak rate at each position under test, leading out the tracer gas in the box under test.

In the foregoing technical solution, after leak detection of the box under test is completed, the tracer gas in the box under test is led out, preventing the tracer gas from contaminating an internal environment of the box under test and affecting battery performance of a battery cell.

In some embodiments of the first aspect of this application, the method for box leak detection further includes:

before filling the box under test with the tracer gas, covering the plurality of positions under test with protective covers, so that the tracer gas is able to leak from the plurality of positions under test into the protective covers.

In the foregoing technical solution, the protective covers cover the plurality of positions under test, which can create a clean and stable detection environment, minimize influence of an external gas flow on a detection result, and improve detection accuracy.

In some embodiments of the first aspect of this application, the covering the plurality of positions under test with protective covers, so that the tracer gas is able to leak from the plurality of positions under test into the protective covers includes:

correspondingly covering the plurality of positions under test with a plurality of such protective covers, so that the tracer gas is able to leak from the position under test into a corresponding protective cover.

In the foregoing technical solution, by using a protective cover to cover a corresponding position under test, a leaked tracer gas can enter a corresponding protective cover, which creates a clean and stable detection environment for the corresponding position under test, minimizing influence of an external gas flow on a detection result and improving detection accuracy.

According to a second aspect, an embodiment of this application provides a leak detection system, configured to perform leak detection on a plurality of positions under test of a box under test, where the leak detection system includes:

a gas-filling apparatus, configured to fill the box under test with a tracer gas; and a gas detection apparatus, where the gas detection apparatus is provided corresponding to the position under test, and the gas detection apparatus is configured to measure a leak rate at the corresponding position under test.

In the foregoing technical solution, the gas detection apparatus can perform leak detection on each position under test of the box under test. In this way, not only a specific leak position can be determined, so that leak-proof treatment is subsequently performed on the leak position in a targeted manner, but also a leak rate at each position under test can be measured, providing a basis for a level of to-be-taken leak-proof measures and whether to take leak-proof measures, thereby obtaining more precise leak information.

In some embodiments of the second aspect of this application, the leak detection system further includes a plurality of leak detection tools, where the leak detection tool is provided corresponding to the position under test, and the gas detection apparatus is installed at the position under test by using the leak detection tool.

In the foregoing technical solution, the gas detection apparatus is installed at the position under test by using the leak detection tool, which is convenient for the gas detection apparatus to stably detect the position under test.

In some embodiments of the second aspect of this application, the leak detection system further includes a negative pressure apparatus, where the negative pressure apparatus is configured to lead a gas at the position under test to the gas detection apparatus.

In the foregoing technical solution, the negative pressure apparatus is configured to enable the gas at the position under test to quickly move to the gas detection apparatus for detection, shortening the time for the gas, leaked from the position under test, to move to the gas detection apparatus, thereby shortening the time for leak detection on the entire box and improving detection efficiency.

In some embodiments of the second aspect of this application, the gas detection apparatus includes a gas sensor.

In the foregoing technical solution, the gas sensor has advantages of long-term stable operation, good repeatability, fast response, and little influence by coexisting substances (such as ambient gases).

In some embodiments of the second aspect of this application, the leak detection system further includes protective covers, where the protective covers are configured to cover the plurality of positions under test, so that the tracer gas is able to leak from the plurality of positions under test into the protective covers.

In the foregoing technical solution, the protective covers cover the plurality of positions under test, which can create a clean and stable detection environment, minimize influence of an external gas flow on a detection result, and improve detection accuracy.

In some embodiments of the second aspect of this application, the protective cover is provided in plurality, and the position under test is provided corresponding to the protective cover, so that the gas detection apparatus measures the leak rate at the corresponding position under test by using the protective cover, and the tracer gas is able to leak from the position under test into a corresponding protective cover.

In the foregoing technical solution, by using a protective cover to cover a corresponding position under test, a leaked tracer gas can enter a corresponding protective cover, which creates a clean and stable detection environment for the corresponding position under test, minimizing influence of an external gas flow on a detection result and improving detection accuracy.

In some embodiments of the second aspect of this application, the leak detection system further includes a gas calibration detection apparatus, w % here the gas calibration detection apparatus is configured to obtain a calibrated leak rate of the box under test.

In the foregoing technical solution, the gas calibration detection apparatus can not only measure a concentration of the tracer gas in the box under test, but also obtain a calibrated leak rate after the concentration of the tracer gas in the box under test reaches a preset range, providing a comparative value for a subsequent measured leak rate at each position under test. Only when the leak rate at each position under test is lower than the calibrated leak rate, a sealing level of the box under test can meet design requirements.

BRIEF DESCRIPTION OF DRAWINGS

In order to describe the technical solutions in the embodiments of this application more clearly, the following briefly describes the accompanying drawings required for describing the embodiments. It should be understood that, the accompanying drawings below only show some embodiments of this application, and therefore shall not be considered as a limitation to the scope. A person of ordinary skill in the art may still derive other related drawings from the accompanying drawings without creative efforts.

Figure 1:
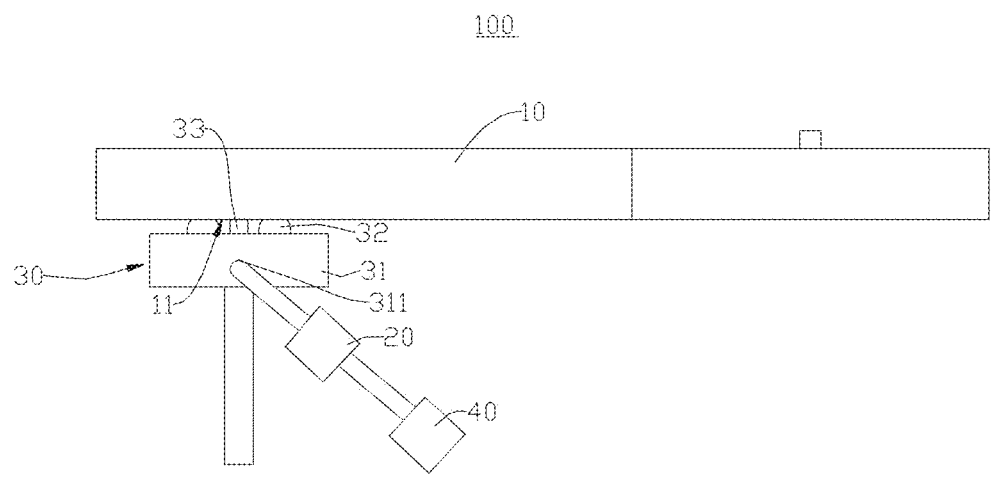
FIG. 1 is a schematic diagram of leak detection at a position under test of a box under test by a leak detection system from a first perspective according to an embodiment of this application.

Reference signs: 100. leak detection system; 10. box under test; 11. position under test; 12. first box wall; 13. second box wall; 14. gas-filling port; 15. gas outlet; 16. third box wall; 17. fourth box wall; 20. gas detection apparatus; 30. leak detection tool; 31. body; 311. gas suction port; 32. roller; 33. gas suction pipe; 40. negative pressure apparatus. 50. gas pipe; 60. gas calibration detection apparatus; 70. calibration mechanism; A. first direction; B. second direction.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. The components of the embodiments of this application generally described and shown in the accompanying drawings herein may be arranged and designed in a variety of different configurations.

Therefore, the following detailed description of the embodiments of this application provided in the accompanying drawings is not intended to limit the scope of the claimed application, but merely illustrates the selected embodiments of this application. All other embodiments obtained by a person of ordinary skill in the art based on the embodiments of this application without creative efforts shall fall within the protection scope of this application.

It should be noted that, without conflicts, the embodiments and features in the embodiments in this application may be combined with each other.

It should be noted that similar reference signs and letters indicate similar items in the following drawings, and therefore once an item is defined in one drawing, it does not need to be further defined and explained in the subsequent drawings.

In the description of the embodiments of this application, it should be noted that indicated orientations or positional relationships are based on orientations or positional relationships shown in the accompanying drawings, or orientations or positional relationships that products of this application are usually placed in use, or orientations or positional relationships usually understood by a person skilled in the art. The orientations or positional relationships are only intended to help the description of this application and simplify the description rather than indicate or imply that the apparatuses or components must have specific orientations, or be constructed and manipulated according to specific orientations, and therefore shall not be construed as limitations on this application. In addition, the terms "first", "second", and "third", and the like are merely intended for distinguishing in descriptions, and shall not be understood as an indication or implication of relative importance.

In the description of this application, it should be further noted that unless otherwise specified and defined explicitly, the terms "dispose", "mount", and "connect" should be understood in their general senses. For example, they may refer to a fixed connection, a detachable connection, or an integral connection, and may refer to a direct connection or an indirect connection via an intermediate medium. A person of ordinary skill in the art can understand specific meanings of these terms in this application based on specific situations.

In this application, "a plurality of" means more than two (inclusive).

A battery cell in this application may include a lithium-ion secondary battery, a lithium-ion primary battery, a lithium-sulfur battery, a sodium-lithium-ion battery, a sodium-ion battery, a magnesium-ion battery, or the like. This is not limited in this embodiment of this application. The battery cell may be cylindrical, flat, or rectangular, or have other shapes. This is also not limited in the embodiments of this application. By packaging method, battery cells are typically classified into three types: cylindrical cells, prismatic cells, and pouch cells. This is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. Generally, a battery includes a box configured to package one or more battery cells. The box can prevent a liquid or another foreign matter from affecting charging or discharging of the battery cell.

In this application, a box is a structure with an accommodating space, formed by a plurality of housings through detachable connection or fixed connection. The accommodating space of the box can be used for accommodating battery cells, and certainly, the box can also be used for accommodating other target objects that need to be sealed for storage. This is not limited in the embodiments of this application. A target object accommodated in the box may be cylindrical, flat, or rectangular, or have other shapes. This is also not limited in the embodiments of this application. For example, if battery cells are accommodated in the accommodating space of the box, the battery cell may be cylindrical, flat, or rectangular, or have other shapes. By packaging method, battery cells are typically classified into three types: cylindrical cells, prismatic cells, and pouch cells. This is not limited in the embodiments of this application either.

The development of battery technologies relates to many design factors, for example, performance parameters such as energy density, cycle life, discharge capacity, and charge and discharge rate. Safety of batteries also needs to be considered.

For batteries, sealing performance of a box is an important factor affecting safety performance of the batteries during charging and discharging. If sealing performance cannot meet design requirements, an external environment will easily affect an internal use environment of a battery box. For example, poor sealing performance of the box results in poor waterproof performance, and water entering inside the box causes internal short circuit. When short circuit, overcharge, or the like occurs, it may cause thermal runaway inside the battery cell, resulting in a sudden increase in pressure or temperature. In severe cases, the battery cell may explode or catch fire.

Therefore, it is necessary to strictly control the sealing performance of the battery box to ensure that the sealing performance of the battery box meets the requirements. A commonly used method is to perform a leak rate measurement on the box, and determine the sealing performance of the box based on the leak rate. A small leak rate indicates good sealing performance, and conversely, a large leak rate indicates poor sealing performance.

The inventors found that for measuring a leak rate of a battery box, whole box detection is adopted, that is, the box as a whole is put into a detection space, and then a tracer gas is filled into the box. The tracer gas leaked from the box will enter a space under test, and the leak rate of the box can be obtained by measuring a concentration of the tracer gas in the space under test. However, such detection method obtains a leak rate of the entire box, and cannot determine a specific position of the box where leak occurs and a leak rate at the specific leak position.

In view of this, the embodiments of this application provide a technical solution in which a leak rate at each position under test of a box is measured, thereby determining a specific leak position and a leak rate at the specific leak position.

The technical solution described in the embodiments of this application is suitable for battery box detection and other boxes that require leak detection.

For ease of description, an example in which a battery box is a box under test 10 is used for description in the following embodiments.

Figure 2:
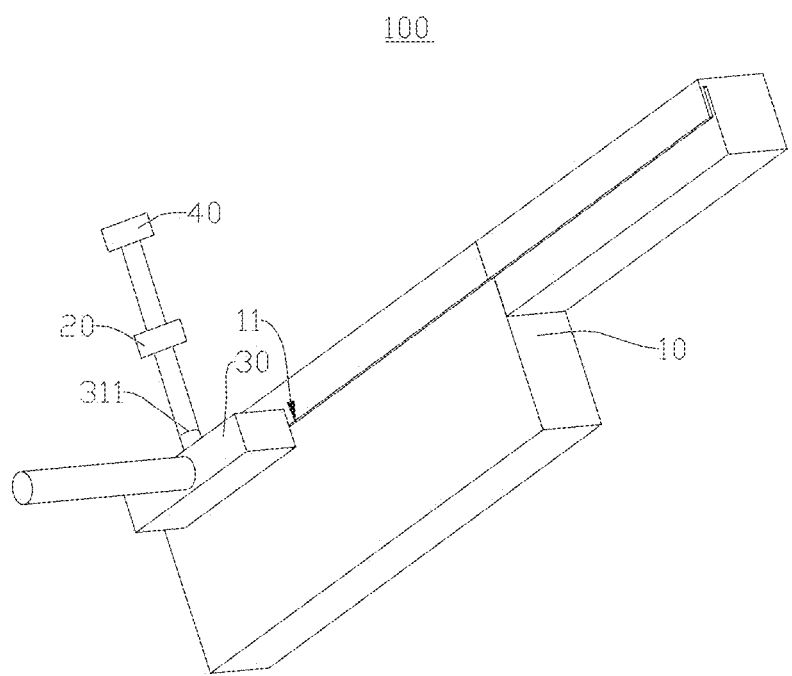
FIG. 2 is a schematic diagram of leak detection at a position under test of a box under test by a leak detection system from a second perspective according to an embodiment of this application.

As shown in FIG. 1 and FIG. 2, an embodiment of this application provides a leak detection system 100 for performing leak detection on a plurality of positions under test 11 of the box under test 10. The leak detection system 100 includes a gas-filling apparatus or gas-filler and a gas detection apparatus or gas detector 20. The gas-filling apparatus is configured to fill the box under test 10 with a tracer gas. The gas detection apparatuses 20 are provided corresponding to the positions under test 11, and the gas detection apparatus 20 is configured to measure a leak rate at the corresponding position under test 11.

It should be noted that "the gas detection apparatuses 20 are provided corresponding to the positions under test 11" may be understood as that the gas detection apparatuses 20 are provided in one-to-one correspondence with the positions under test 11. If the position under test 11 is provided in plurality, a quantity of corresponding gas detection apparatuses 20 is the same as a quantity of the positions under test 11. "The gas detection apparatuses 20 are provided corresponding to the positions under test 11" may also be understood as that a leak rate at one position under test 11 is measured by using one gas detection apparatus 20. Even if there is only one gas detection apparatus 20, a leak rate at each position under test 11 is measured separately by using the gas detection apparatus 20.

The gas detection apparatus 20 performs leak detection on each position under test 11 of the box under test 10. In this way, not only a specific leak position can be determined, so that leak-proof treatment is subsequently performed on the leak position in a targeted manner, but also the leak rate at each position under test 11 can be measured, providing a basis for a level of to-be-taken leak-proof measures and whether to take leak-proof measures, thereby obtaining more precise leak information.

The tracer gas is a gas used for leak detection, where a quality of the tracer gas makes the tracer gas easy to be detected or traced. After the tracer gas is mixed with air, the tracer gas cannot change at all and can be detected at very low concentration. The tracer gas includes helium, carbon dioxide, ammonia, hydrogen, and the like.

Different gas detection apparatuses 20 can be selected according to different tracer gases. In some embodiments, the gas detection apparatus 20 includes a gas sensor, such as a semiconductor gas sensor, a pyroelectric sensor, an optical fiber sensor, and a hydrogen sensor with a palladium alloy thin film. The gas sensor has advantages of long-term stable operation, good repeatability, fast response, and little influence by coexisting substances (such as ambient gases).

The gas detection apparatus 20 measures a concentration of the tracer gas in real time.

In some embodiments, the gas detection apparatus 20 may further include a helium mass spectrometer leak detector. When the gas detection apparatus 20 includes the helium mass spectrometer leak detector, helium or hydrogen is used as the tracer gas. A background noise of helium is low, that is, detection is performed in the atmosphere, and content of helium in the atmosphere is very small, but detection accuracy is not affected. A molecular weight and a viscosity coefficient of helium are small, and therefore helium is easy to pass a leak and diffuse; in addition, helium is an inert gas and does not corrode devices, so helium is often used as a tracer gas. The helium mass spectrometer leak detector is placed at the position under test 11. If the tracer gas leaks from the position under test 1I and comes into contact with the helium mass spectrometer leak detector, the helium mass spectrometer leak detector responds, so as to know whether leak occurs at the position under test 11 and magnitude of a leak rate.

In an actual detection process, if the gas detection apparatus 20 approaches the position under test 11 for leak rate measurement, there may be a difference in measurement results due to different distances between the gas detection apparatus and the position under test 11.

Based on this, in some embodiments, the leak detection system 100 further includes a plurality of leak detection tools 30, where the leak detection tools 30 are provided corresponding to the positions under test 11, and the gas detection apparatus 20 is installed at the position under test 11 by using the leak detection tool 30. A structure and a size of the leak detection tool 30 are constant. After the gas detection apparatus 20 is installed at the position under test 11 by using the leak detection tool 30, a distance between the gas detection apparatus 20 and the position under test 11 is constant, which avoids a leak detection result being affected by a changing distance between the gas detection apparatus 20 and the position under test 11. In addition, the gas detection apparatus 20 is installed at the position under test 11 by using the leak detection tool 30, which is convenient for the gas detection apparatus to stably detect the position under test 11.

For example, as shown in FIG. 1 and FIG. 2, one of the positions under test 11 of the box under test 10 is a strip-shaped sealing position, where the sealing position has a specific length. A leak detection tool 30 corresponding to the sealing position includes a body 31 and two rollers 32, where the roller 32 is rotatably provided on the body 31, and the body 31 is provided with a gas suction port 311. A gas suction pipe 33 is provided between the two rollers 32, and the two rollers 32 define a position for gas suction. The gas suction pipe 33 communicates with the gas suction port 311, and the gas detection apparatus 20 is installed on the leak detection tool 30 and communicates with the gas suction pipe 33 through the gas suction port 311, so that a gas leaked from the position under test 11 can reach the gas detection apparatus 20 through the gas suction pipe 33 and the gas suction port 311. The roller 32 is in contact with a sealing surface of the sealing position, and rotation of the roller 32 can drive the leak detection tool 30 to move along the sealing surface to change a position corresponding to the gas suction pipe 33. The leak detection tool 30 maintains a constant distance between the sealing surface and the gas detection apparatus.

In some embodiments, the leak detection tool 30 may also be a profiling cover. The profiling cover covers the position under test, so that the tracer gas leaked from the position under test enters the profiling cover and reaches the gas detection apparatus 20 through an outlet on the profiling cover. The profiling cover is a structure matching a structure of the position under test. For example, if the position under test is a bolt connecting position, an interior of the profiling cover is a cavity matching shapes of a nut and a gasket. For another example, if the position under test is a connecting position of a pressure relief mechanism, an interior of the profiling cover is a cavity matching a shape of the pressure relief mechanism.

In some embodiments, the leak detection system 100 further includes a negative pressure apparatus or negative pressure structure 40, where the negative pressure apparatus 40 is configured to lead a gas at the position under test 11 to the gas detection apparatus 20.

As shown in FIG. 1 and FIG. 2, the negative pressure apparatus 40 is connected to one side of the gas detection apparatus 20 away from the leak detection tool 30, that is, downstream of the gas detection apparatus 20. The negative pressure apparatus sucks the gas at the position under test 11 from the gas suction port 311 to the gas detection apparatus 20 in a form of negative pressure, so that the gas detection apparatus 20 can measure a concentration of the tracer gas leaked from a corresponding position under test 11. The negative pressure apparatus 40 is configured to enable the gas at the position under test 11 to quickly move to the gas detection apparatus 20 for detection, shortening the time for the gas, leaked from the position under test 11, to move to the gas detection apparatus 20, thereby shortening the time for leak detection on the entire box and improving detection efficiency.

A corresponding leak detection tool 30 may have different structures depending on different shapes and structures of the position under test 11.

In some embodiments, the leak detection system further includes a gas calibration detection apparatus or a gas calibration detector, where the gas calibration detection apparatus is configured to obtain a calibrated leak rate of the box under test 10.

The gas calibration detection apparatus can not only measure a concentration of the tracer gas in the box under test 10, but also obtain a calibrated leak rate after the concentration of the tracer gas in the box under test 10 reaches a preset range, providing a comparative value for a subsequent measured leak rate at each position under test 11. Only when the leak rate at each position under test 11 is lower than the calibrated leak rate, a sealing level of the box under test 10 can meet design requirements. That is, sealing of the box under test is qualified.

The gas calibration detection apparatus and the gas detection apparatus 20 may be a same detection apparatus. The detection apparatus first serves as a gas calibration detection apparatus to measure the concentration of the tracer gas in the box under test 10, and obtains a calibrated leak rate of the box under test 10 after the concentration of the tracer gas in the box under test 10 reaches the preset range. After obtaining the calibrated leak rate of the box under test 10, the detection apparatus serves as a gas detection apparatus to measure the leak rate at each position under test, and then compares the leak rate at each position under test 11 with the previously obtained calibrated leak rate.

In some embodiments, the gas calibration detection apparatus and the gas detection apparatus 20 may be independent detection apparatuses.

To avoid influence of an external ambient gas flow on a detection result, in some embodiments, the leak detection system further includes protective covers, where the protective covers are configured to cover the plurality of positions under test 11, so that the tracer gas is able to leak from the plurality of positions under test 11 into the protective covers. The protective covers cover the plurality of positions under test 11, which can create a clean and stable detection environment, minimize influence of an external gas flow on a detection result, and improve detection accuracy.

In some embodiments, one protective cover is provided. The box under test 10 as a whole is put into the protective cover, the tracer gas is able to leak from each position under test 11 into the protective cover, and the gas detection apparatus 20 measures, in the protective cover, a leak rate at a corresponding position under test 11.

In some other embodiments, the gas detection apparatus is provided outside the protective cover. The gas at the corresponding position under test 11 is led to the gas detection apparatus outside the protective cover by using the negative pressure apparatus, and the gas detection apparatus measures, outside the protective cover, the concentration of the tracer gas leaked from the corresponding position under test 11.

In some embodiments, the protective covers are provided in plurality, the positions under test 11 are provided corresponding to the protective covers, and a quantity of positions under test 11 is the same as a quantity of the protective covers, so that the gas detection apparatus 20 measures the leak rate at the corresponding position under test 11 by using the protective cover, and the tracer gas is able to leak from the position under test 11 into a corresponding protective cover. By using a protective cover to cover a corresponding position under test 11, leaked tracer gas can enter a corresponding protective cover, which creates a clean and stable detection environment for the corresponding position under test 11, minimizing influence of an external gas flow on a detection result, avoiding mutual interference of the tracer gases leaked from various positions under test 11, and further improving detection accuracy.

Figure 3:
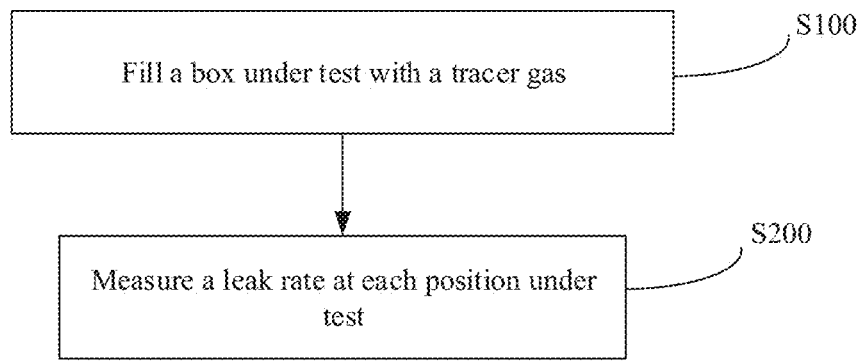
FIG. 3 is a flowchart of a method for box leak detection according to some embodiments of this application.

As shown in FIG. 3, an embodiment of this application further provides a method for box leak detection. The box under test 10 has a plurality of positions under test 11, and the method for box leak detection includes the following steps.

Step S100: Fill the box under test 10 with a tracer gas.

Step S200: Measure a leak rate at each position under test 11.

Leak detection is performed on each position under test 11 of the box under test 10. In this way, not only a specific leak position can be determined, so that leak-proof treatment is subsequently performed on the leak position in a targeted manner, but also the leak rate at each position under test 11 can be measured, improving accuracy of box leak detection and providing a basis for a level of to-be-taken leak-proof measures and whether to take leak-proof measures.

Figure 4:
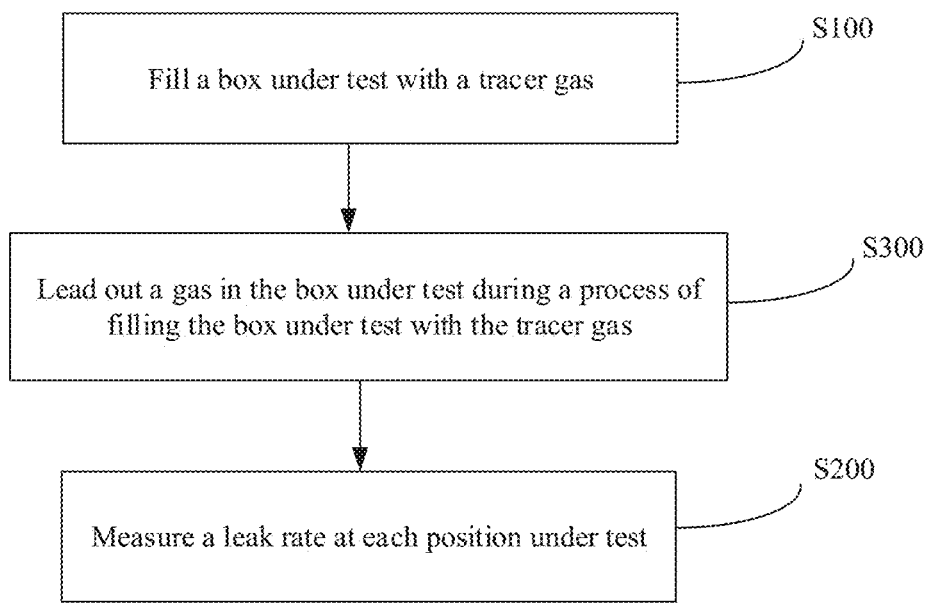
FIG. 4 is a flowchart of a method for box leak detection according to still some other embodiments of this application.

To fill the box under test 10 with the tracer gas and enable a concentration of the tracer gas inside the box under test 10 to reach a preset range, a gas originally inside the box under test 10 needs to be exhausted to make room for the tracer gas. Due to a limited negative pressure resistance capability of the box under test 10, if the box under test 10 is first evacuated to be in an absolute vacuum and then filled with the tracer gas, the box under test 10 is prone to be damaged. In addition, if the box under test 10 is only filled with the tracer gas, due to limitation of a pressure resistance capability of the box under test 10, an amount of the tracer gas filled into the box under test 10 is limited. As a result, the concentration of the tracer gas is difficult to be increased, and requirements of the gas detection apparatus 20 for concentration detection are difficult to be met (where lower concentration of the tracer gas causes lower accuracy of a test result of the gas detection apparatus). Therefore, as shown in FIG. 4, in some embodiments, the method for box leak detection further includes the following step.

Step S300: Lead out a gas in the box under test 10 during a process of filling the box under test 10 with a tracer gas.

The gas originally in the box under test 10 is led out during the process of filling the box under test 10 with the tracer gas, which can make room for the tracer gas, and therefore the concentration of the tracer gas in the box under test 10 can reach a preset range, avoiding negative pressure inside the box under test 10. In addition, filling of the tracer gas and exhausting of the gas originally in the box under test 10 are performed at the same time, which can also accelerate diffusion of the tracer gas in the box under test 10.

Figure 5:
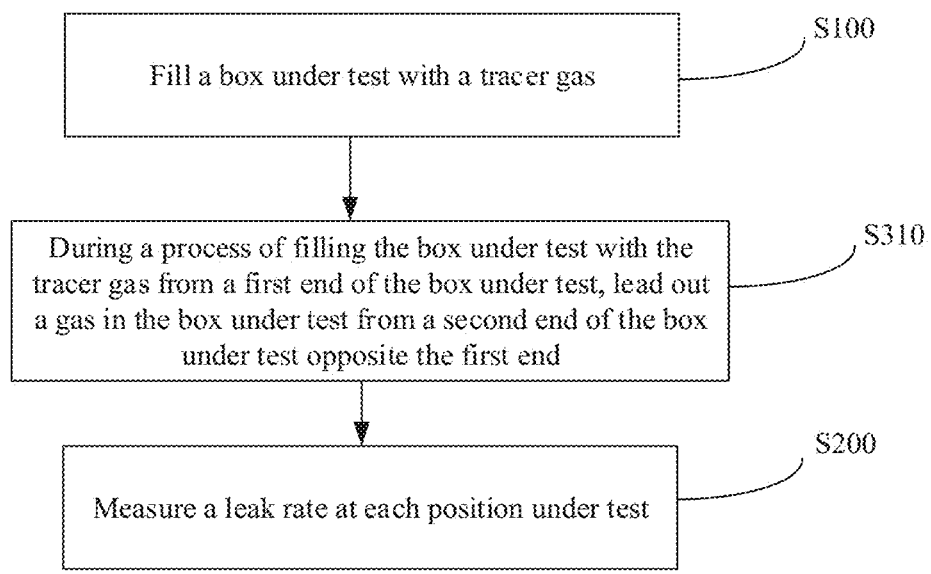
FIG. 5 is a flowchart of a method for box leak detection according to some other embodiments of this application.

If the box under test 10 is simply filled with the tracer gas, the box under test 10 needs to stand for a long time to make the tracer gas diffuse uniformly in the box. Especially, the concentration of the tracer gas at a position far from a gas-filling end is very low. Therefore, as shown in FIG. 5, in some embodiments, step S300 includes the following step.

Step S310. During a process of filling the box under test 10 with the tracer gas from a first end of the box under test 10, lead out the gas in the box under test 10 from a second end of the box under test 10 opposite the first end.

The first end and the second end of the box under test 10 are arranged opposite to each other. The first end of the box under test 10 is provided with a gas-filling port 14 for filling the box under test 10 with the tracer gas, and the second end of the box under test 10 is provided with a gas outlet 15 for exhausting the gas inside the box. During a process of filling the box under test 10 with the tracer gas from the gas-filling port 14, the tracer gas in the box under test 10 gradually increases, and the gas originally in the box under test 10 is exhausted from the gas outlet 15 to make room for the tracer gas, and therefore the concentration of the tracer gas in the box under test 10 can reach a preset range. In addition, by using a replacement method of filling gas from one end of the box under test 10 and exhausting gas from another end opposite the one end of the box under test 10, a fixed gas flow can be formed. Driven by the gas flow, the tracer gas quickly diffuses to various parts inside the box under test 10, greatly improving efficiency to quickly make the tracer gas in the box under test 10 tend to be in a single concentration.

By exhausting air in the box under test 10, more tracer gases can be filled, and the concentration of the tracer gas inside the box under test 10 can be increased as required, so that the gas detection apparatus can achieve better test results. Each gas-filling channel and gas-exhausting channel are configured with a pressure regulating valve and a solenoid valve, which can flexibly adjust pressure parameters and time.

It should be noted that the first end and the second end of the box under test 10 being arranged opposite to each other can be understood as that the first end and the second end of the box under test 10 are respectively a first box wall 12 and a second box wall 13 that are of the box under test 10 and that are arranged opposite to each other in a first direction A, where the gas-filling port 14 is provided on a first side surface, and the gas outlet 15 is provided on a second side surface. A central axis of the gas-filling port 14 and a central axis of the gas outlet 15 are arranged in parallel or to form an included angle.

Figure 6:
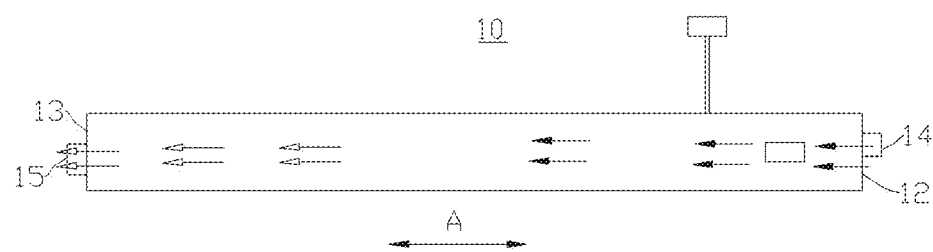
FIG. 6 is a schematic structural diagram of a box under test according to some embodiments of this application.

For example, as shown in FIG. 6, the gas-filling port 14 is provided on the first box wall 12, and the gas outlet 15 is provided on the second box wall 13. The central axis of the gas-filling port 14 and the central axis of the gas outlet 15 are parallel, the tracer gas diffuses along the direction of the solid arrow in the figure, and the gas originally inside the box under test 10 moves along the direction of the hollow arrow in the figure.

Figure 7:
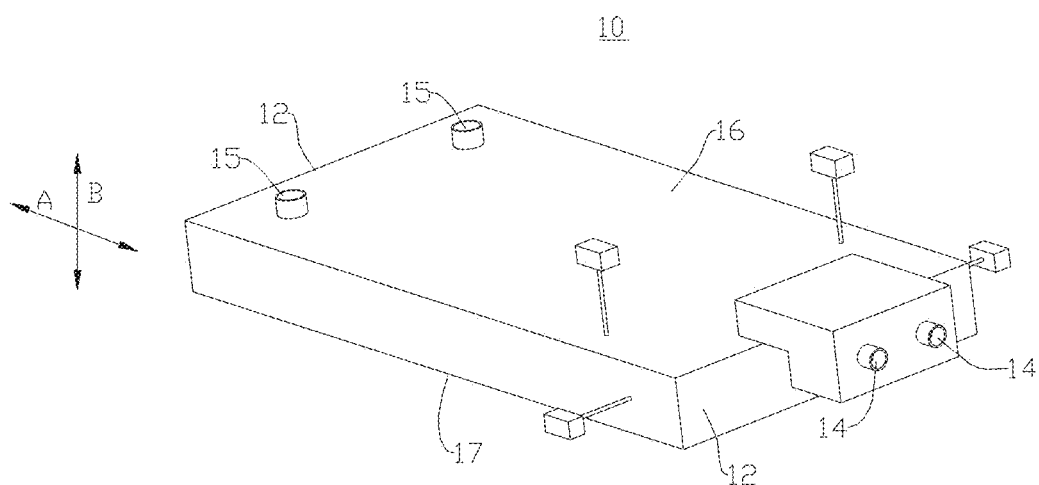
FIG. 7 is a schematic structural diagram of a box under test according to still some other embodiments of this application.
Figure 8:
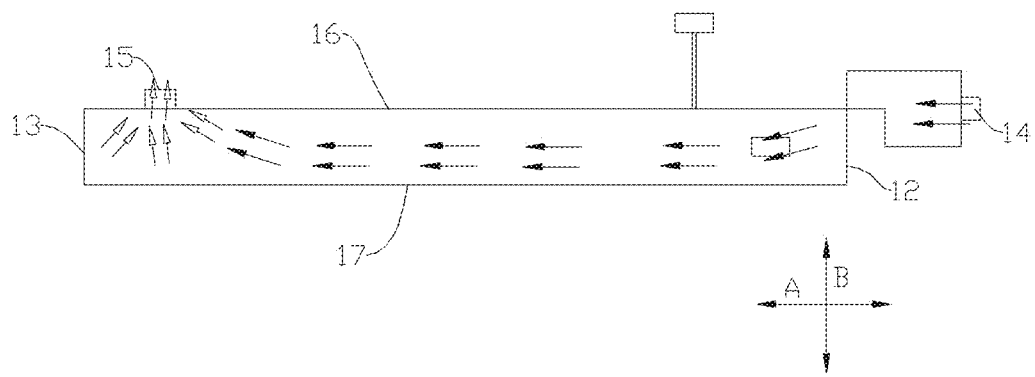
FIG. 8 is a schematic diagram of a direction of an gas flow in the box under test in FIG. 7.

As shown in FIG. 7, the box under test 10 further has a third box wall 16 and a fourth box wall 17 that are arranged opposite to each other in a second direction B. The first direction A and the second direction B are perpendicular, the gas-filling port 14 is provided on a first side wall, and the gas outlet 15 is provided on a third side wall and close to a second side wall. In this case, the first end and the second end are roughly arranged opposite to each other. As shown in FIG. 8, according to a flow principle of gas flow, during a process of exhausting the gas originally inside the box under test 10 from the gas outlet 15, that is, the direction shown by the hollow arrow in the figure, the tracer gas can quickly diffuse inside the box under test 10 along the first direction A and the second direction B, which can further speed up a diffusion rate, so that the tracer gas can quickly fill the entire box under test 10, making the tracer gas in the box under test 10 tend to be in a single concentration.

Figure 9:
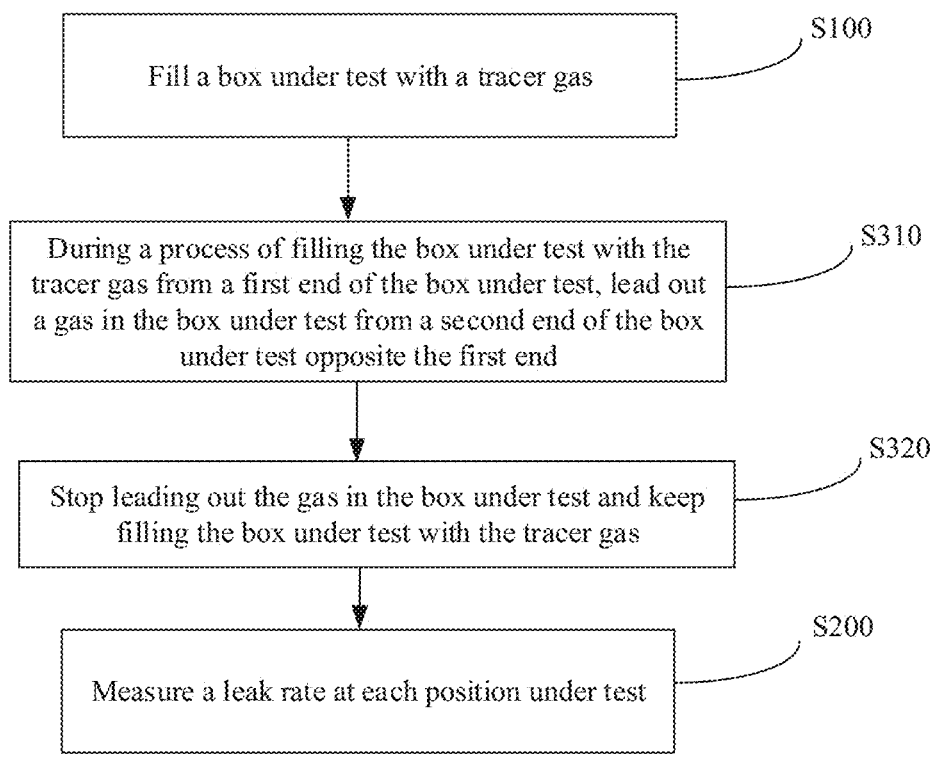
FIG. 9 is a flowchart of a method for box leak detection according to yet some other embodiments of this application.

As shown in FIG. 9, in some embodiments, step S300 includes the following step.

Step S320: During the process of filling the box under test 10 with the tracer gas, after the gas in the box under test 10 is led out for a period of time, stop leading out the gas in the box under test 10 and keep filling the box under test 10 with the tracer gas.

Figure 10:
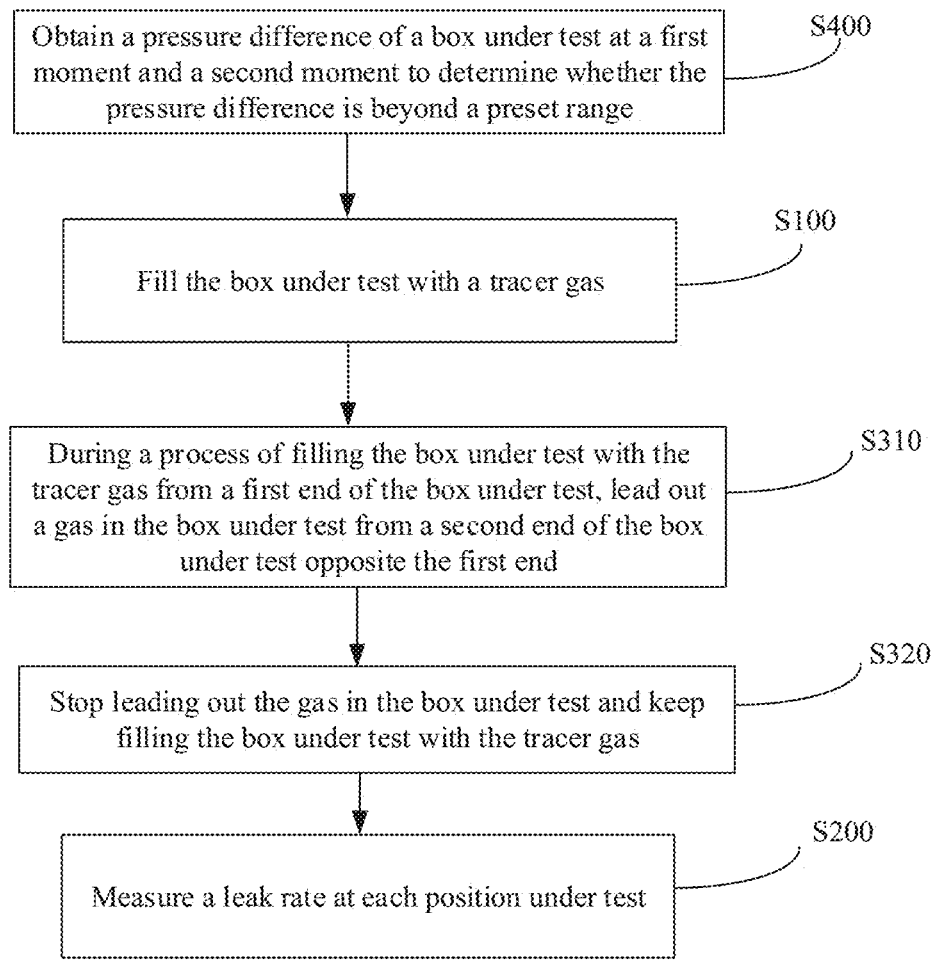
FIG. 10 is a flowchart of a method for box leak detection according to another embodiment of this application.

When box leak detection is performed, it is necessary to maintain a specific pressure inside the box under test to meet detection requirements. In addition, if the box under test 10 does not have a position with a large leak rate, the box under test 10 is filled with the tracer gas. In a specific period of time, the pressure inside the box under test 10 is within a specific preset range. Therefore, as shown in FIG. 10, in some embodiments, the method for box leak detection further includes the following step.

Step S400: Obtain a pressure difference of the box under test 10 at a first moment and a second moment to determine whether the pressure difference is beyond a preset range.

If an internal pressure of the box under test 10 is beyond the preset range in a period of time from the first moment to the second moment, it indicates that the box under test 10 has a leak position with a large leak rate. Due to the leak position, the pressure inside the box under test 10 cannot reach the preset range when the box under test 10 is filled with the tracer gas. As a result, detection requirements are difficult to be met, and a large amount of tracer gas is emitted in a detection environment, which affects a detection result, and the box under test needs to be repaired. Therefore, it is necessary to detect whether the box under test 10 has a leak position with a large leak rate.

In some embodiments, after step S400 is performed, step S100 is performed to prevent the box under test 10 from having a position with a large leak rate, causing the tracer gas to leak from the position with a large leak rate to affect a detection result of the gas detection apparatus 20 and contaminate the environment.

In some embodiments, before step S100, it can also be detected, by vacuumizing, whether the box under test 10 has a position with a large leak rate. If there is no position with a large leak rate, after the box under test 10 is vacuumized for a period of time, for example, the period of time for vacuumizing is from the first moment to the second moment, an internal pressure difference of the box under test 10 at the first moment and the second moment is within a predetermined range. If there is a position with a large leak rate, an internal pressure difference of the box under test 10 at the first moment and the second moment is beyond a predetermined range. By vacuumizing the box under test 10 to detect whether there is a position with a large leak rate, a negative pressure can be formed in the box under test 10. During the process of filling the box under test 10 with the tracer gas, a diffusion rate of the tracer gas in the box under test 10 is greatly increased. During a process of evacuating the box under test 10 to detect whether there is a position with a large leak rate, the negative pressure in the box under test 10 cannot exceed a negative pressure tolerance of the box under test 10.

Figure 11:
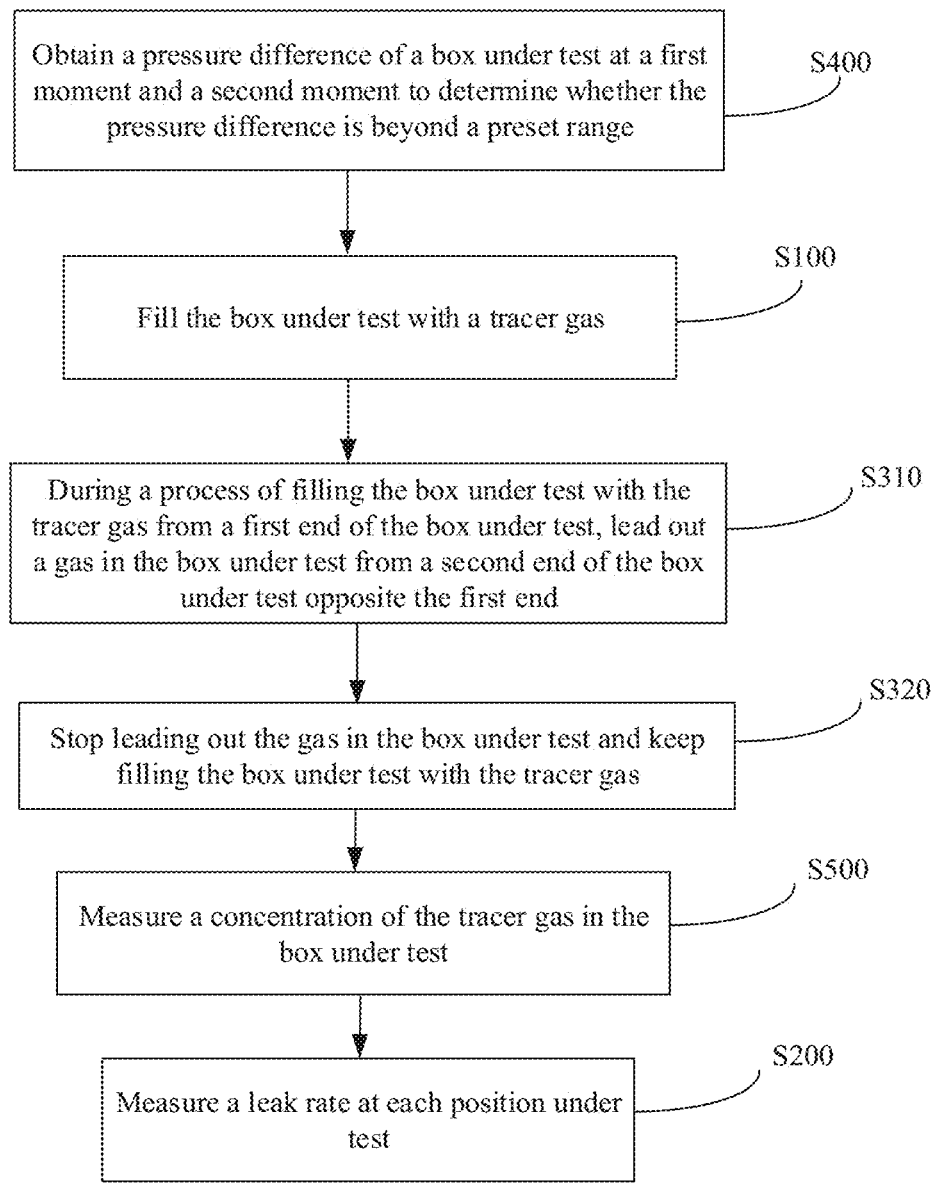
FIG. 11 is a flowchart of a method for box leak detection according to still another embodiment of this application.

As shown in FIG. 11, in some embodiments, the method for box leak detection further includes the following step.

Step S500: Measure a concentration of a tracer gas in the box under test 10, and after the concentration reaches a preset range, measure a concentration of the tracer gas at each position under test 11 to obtain a leak rate at each position under test 11.

After the concentration of the tracer gas in the box under test 10 reaches the preset range, the leak rate at each position under test 11 is measured, so that the concentration of the tracer gas in the box under test meets a detection condition, and a leak detection difference caused by a concentration difference of the tracer gas in the box under test 10 is eliminated.

In some embodiments, after the box under test is filled with the tracer gas for a predetermined period of time, the concentration of the tracer gas in the box under test is obtained, and whether the concentration of the tracer gas is within the preset range is determined. After the box under test 10 is filled with the tracer gas for the predetermined period of time, measurement of the concentration of the tracer gas in the box under test starts without the need to measure the concentration of the tracer gas in the box under test 10 in real time or multiple times, thereby improving detection efficiency.

Figure 12:
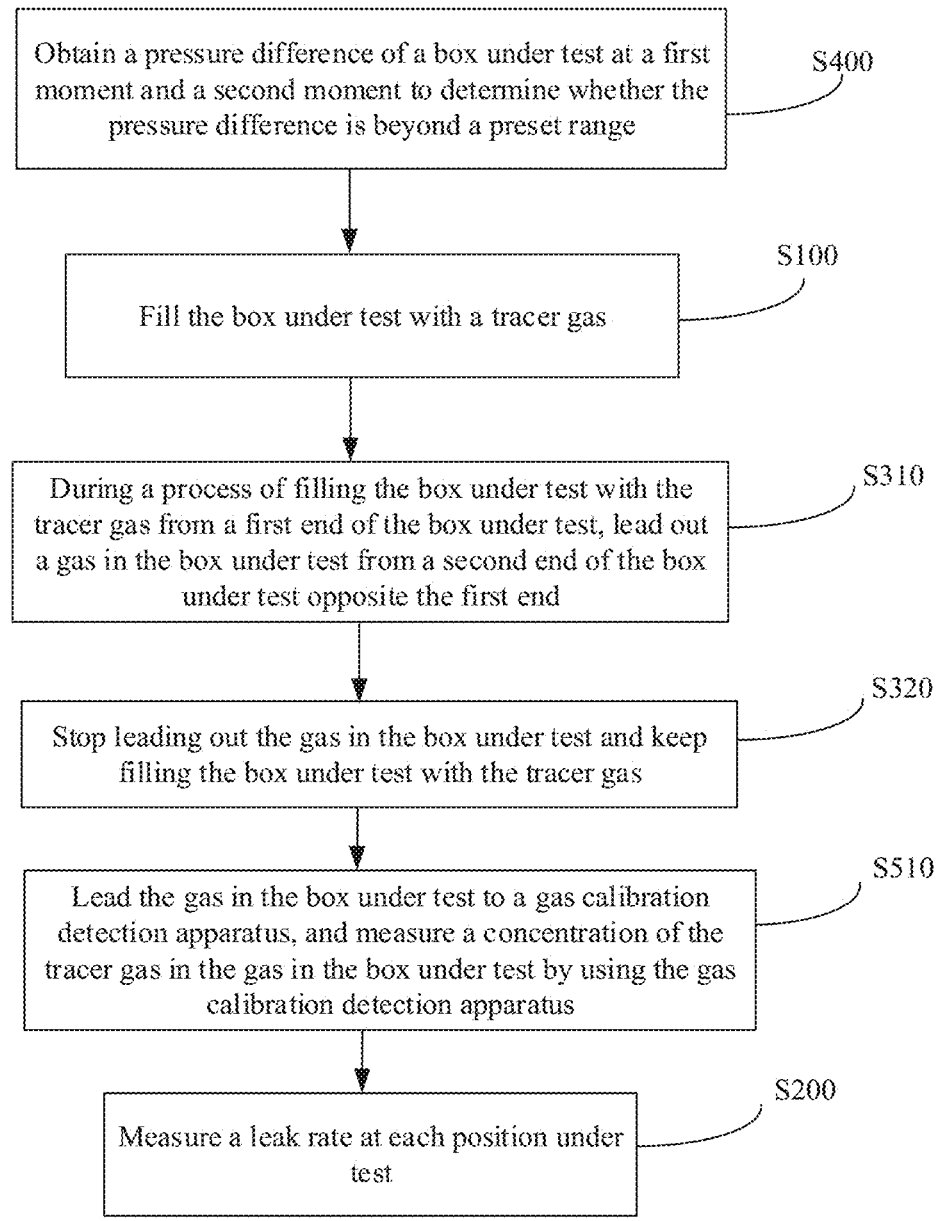
FIG. 12 is a flowchart of a method for box leak detection according to yet another embodiment of this application.

As shown in FIG. 12, in some embodiments, step S500 includes the following step.

Step S510: Lead a gas in the box under test 10 to a gas calibration detection apparatus 60, and measure the concentration of the tracer gas in the gas in the box under test 10 by using the gas calibration detection apparatus 60.

After the gas in the box under test 10 is led into the gas calibration detection apparatus 60, tracer gas concentration measurement is performed, helping measure the concentration of the tracer gas, and therefore a relative positional relationship between the gas calibration detection apparatus 60 and the box under test 10 can be more flexible.

Figure 13:
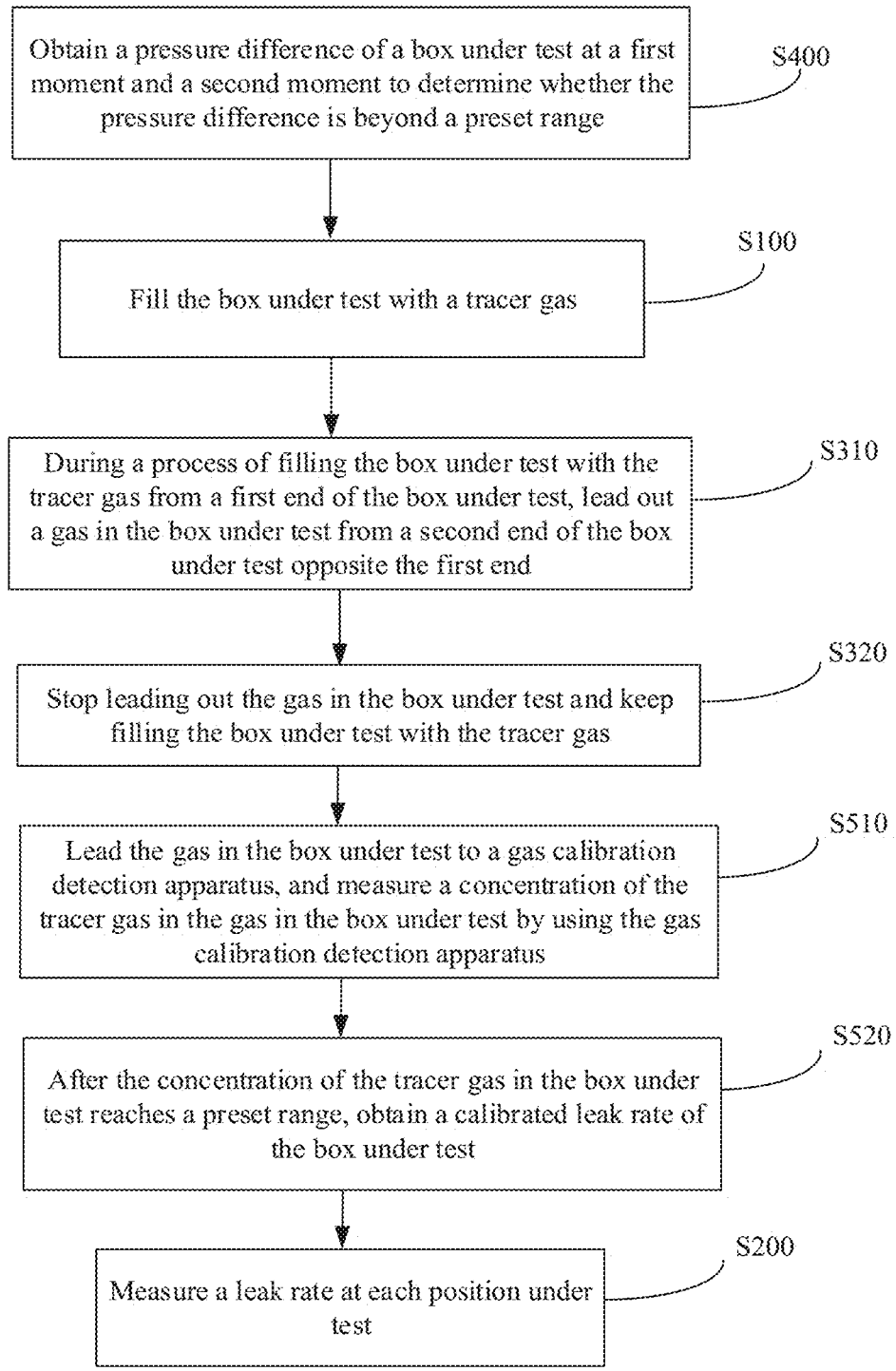
FIG. 13 is a flowchart of a method that is for box leak detection and that has calibrated steps according to some embodiments of this application.

As shown in FIG. 13, in some embodiments, the method for box leak detection further includes the following step.

Step S520: After the concentration of a tracer gas in the box under test 10 reaches a preset range, obtain a calibrated leak rate of the box under test 10.

The calibrated leak rate is obtained after the concentration of the tracer gas in the box under test 10 reaches the preset range, providing a comparative value for a subsequent measured leak rate at each position under test 11. Only when the leak rate at each position under test 11 is lower than the calibrated leak rate, a sealing level of the box under test 10 can meet design requirements.

In some embodiments, step S510 and step S520 may also be regarded as a same step, that is, if it is measured that the concentration of the tracer gas in the box under test 10 is within the preset range in step S510, the calibrated leak rate can be obtained through conversion.

Figure 14:
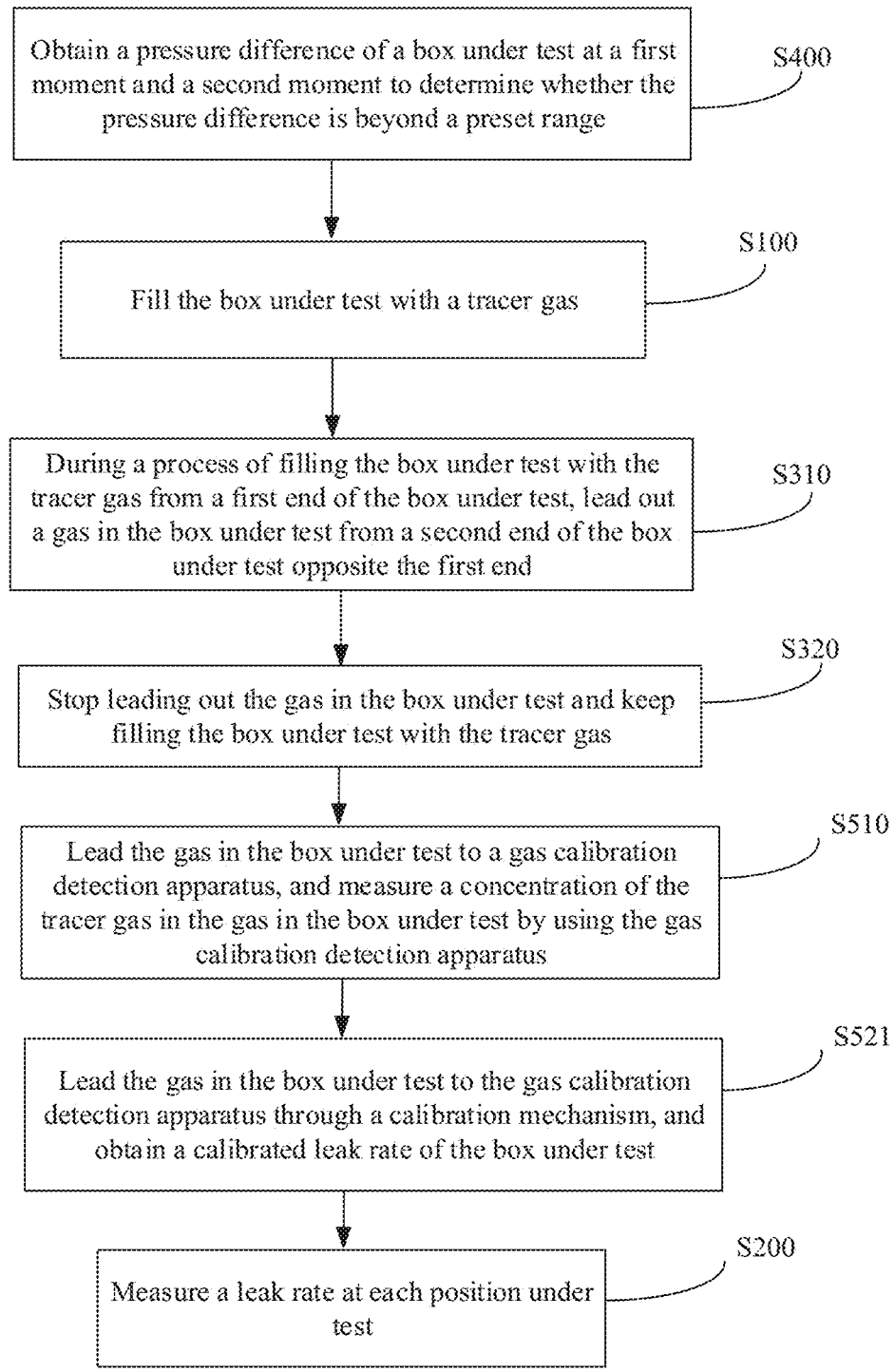
FIG. 14 is a flowchart of a method that is for box leak detection and that has calibrated steps according to some other embodiments of this application.

As shown in FIG. 14, in some embodiments, step S520 includes the following step.

Step S521: Lead out gas in the box under test 10 to the gas calibration detection apparatus 60 through a calibration mechanism 70, and obtain the calibrated leak rate of the box under test. This is convenient to obtain the calibrated leak rate of the box under test 10, and in addition, accuracy of the obtained calibrated leak rate can be improved.

In some embodiments, the method for box leak detection further includes: obtaining a calibrated leak rate at the position under test. After the calibrated leak rate at the position under test is obtained, the leak rate at the position under test is compared with a corresponding calibrated leak rate, and if the leak rate at the position under test is lower than the calibrated leak rate, a sealing design of the position under test meets requirements. This ensures that sealing at each position under test meets design requirements.

Specifically, the obtaining a calibrated leak rate at the position under test includes: leading out the gas in the box under test 10 to the gas calibration detection apparatus 60 through the calibration mechanism 70, and after the concentration of the tracer gas in the box under test 10 reaches the preset range, obtaining the calibrated leak rate at the position under test 11.

Figure 15:
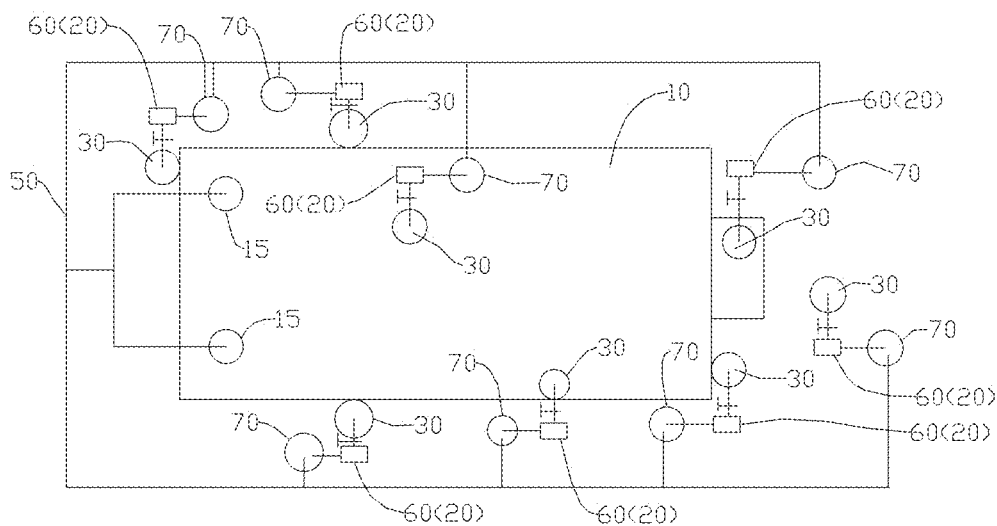
FIG. 15 is a schematic diagram of a state of calibrating a box under test according to some embodiments of this application.

As shown in FIG. 15, a process of leading out the gas in the box under test 10 to the gas calibration detection apparatus 60 through the calibration mechanism 70 and obtaining the calibrated leak rate of the box under test 10 is referred to as calibration. The calibration mechanism 70 is a mechanism with a standard leak, or the calibration mechanism 70 may be a profiling apparatus made according to a corresponding position under test 11, where the profiling apparatus is provided with a standard leak. After the tracer gas passes the calibration mechanism 70, a measured gas concentration is a standard concentration. When the leak rate at the position under test 11 is subsequently measured, a concentration of the tracer gas measured at the position under test 11 is compared with the standard concentration to obtain whether a corresponding position under test meets sealing requirements, and obtain the leak rate by converting the concentration of the tracer gas. In this way, each leak detection can be independently calibrated, and a test difference caused by a concentration difference of the tracer gas in the box under test 10 can be avoided.

In step S400, the gas is taken from the gas outlet 15 of the box under test 10 through a gas pipe 50 connected to the gas calibration detection apparatuses 60 corresponding to various positions under test 11. Specifically, the gas pipe 50 can be connected to the gas calibration detection apparatuses 60 through the calibration mechanisms 70 corresponding to various positions under test 11. The concentration of the tracer gas in the box under test 10 can be obtained by converting the concentration of the gas measured by using the gas calibration detection apparatus 60. After the concentration of the tracer gas in the box under test 10 reaches the preset range, the gas calibration detection apparatus 60 can also obtain the calibrated leak rate of the box under test 10. In this way, the concentration of the gas in the box under test 10 can be controlled to be within a detectable range of concentration of a gas corresponding to a standard leak rate, thereby improving testing accuracy. In addition, by controlling a range of the concentration of the tracer gas, real-time monitoring on a test loop of the gas detection apparatus 20 can be performed, and an abnormality of the leak detection system can be discovered in a timely manner, avoiding a quality risk.

As shown in FIG. 15, a plurality of calibration mechanisms 70 are communicated through the same gas pipe 50, which can take the gas from a same position (for example, taking the gas from the gas outlet 15), reducing a quantity of positions from which the gas is taken, and calibrate a plurality of positions at the same time, increasing calibration efficiency.

Figure 16:
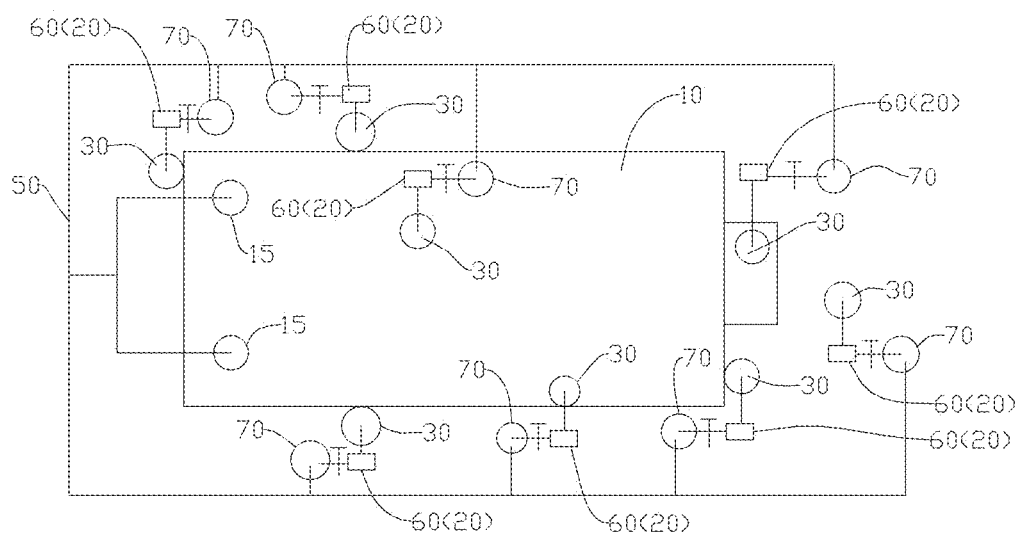
FIG. 16 is a schematic diagram of another state of calibrating a box under test according to some other embodiments of this application.

Referring to FIG. 15 and FIG. 16, in some embodiments, the gas calibration detection apparatus 60 and the gas detection apparatus 20 are a same detection apparatus. Each position under test 11 is correspondingly provided with a calibration mechanism 70, and each position under test 11 is correspondingly provided with a leak detection tool 30. Each calibration mechanism 70 is correspondingly provided with a gas calibration detection apparatus 60 (gas detection apparatus 20), and each calibration mechanism 70 communicates with a gas outlet 15 (or a gas-filling port 14) through the gas pipe 50. The gas calibration detection apparatus 60 (gas detection apparatus 20) can communicate with the calibration mechanism 70 and a gas suction port 311 of a corresponding leak detection tool 30.

As shown in FIG. 15, during calibrating, the gas calibration detection apparatus 60 (gas detection apparatus 20) and the gas suction port 311 of the leak detection tool 30 are disconnected, and the gas calibration detection apparatus 60 (gas detection apparatus 20) communicates with the calibration mechanism 70. The gas in the box under test 10 passes through the gas pipe 50 and the calibration mechanism 70 from the gas outlet 15 and finally reaches the gas calibration detection apparatus 60 (gas detection apparatus 20). Finally, the calibrated leak rate of the box under test 10 is obtained through the concentration of the tracer gas measured by using the gas calibration detection apparatus 60 (gas detection apparatus 20).

As shown in FIG. 16, when leak detection is performed on the position under test 11, a gas calibration detection apparatus 60 (gas detection apparatus 20) at the corresponding position under test communicates with the gas suction port 311 of the leak detection tool 30, and the gas calibration detection apparatus 60 (gas detection apparatus 20) and the calibration mechanism 70 are disconnected. The gas in the box under test 10 leaks from the position under test 11 and finally reaches the gas calibration detection apparatus 60 (gas detection apparatus 20) through the corresponding leak detection tool 30. Finally, a leak rate at the corresponding position under test 11 is obtained and the leak rate is compared with the calibrated leak rate. If the leak rate at the position under test 11 is lower than the calibrated leak rate, sealing of the corresponding position under test 11 meets design requirements.

In some embodiments, the calibrated leak rate can also be obtained by connecting the gas calibration detection apparatus 60 (gas detection apparatus 20) with the calibration mechanism 70 of the corresponding position under test 11, and then the gas calibration detection apparatus 60 (gas detection apparatus 20) is moved to the leak detection tool 30 corresponding to the corresponding position under test 11 to measure the leak rate at the position under test 11.

In some embodiments, the gas calibration detection apparatus 60 and the gas detection apparatus 20 are a same detection apparatus, and there is only one gas calibration detection apparatus 60 (gas detection apparatus 20). The gas calibration detection apparatus 60 (gas detection apparatus 20) sequentially obtains corresponding calibrated leak rates at various positions under test 11 and measures leak rates of the positions under test 11.

Figure 17:
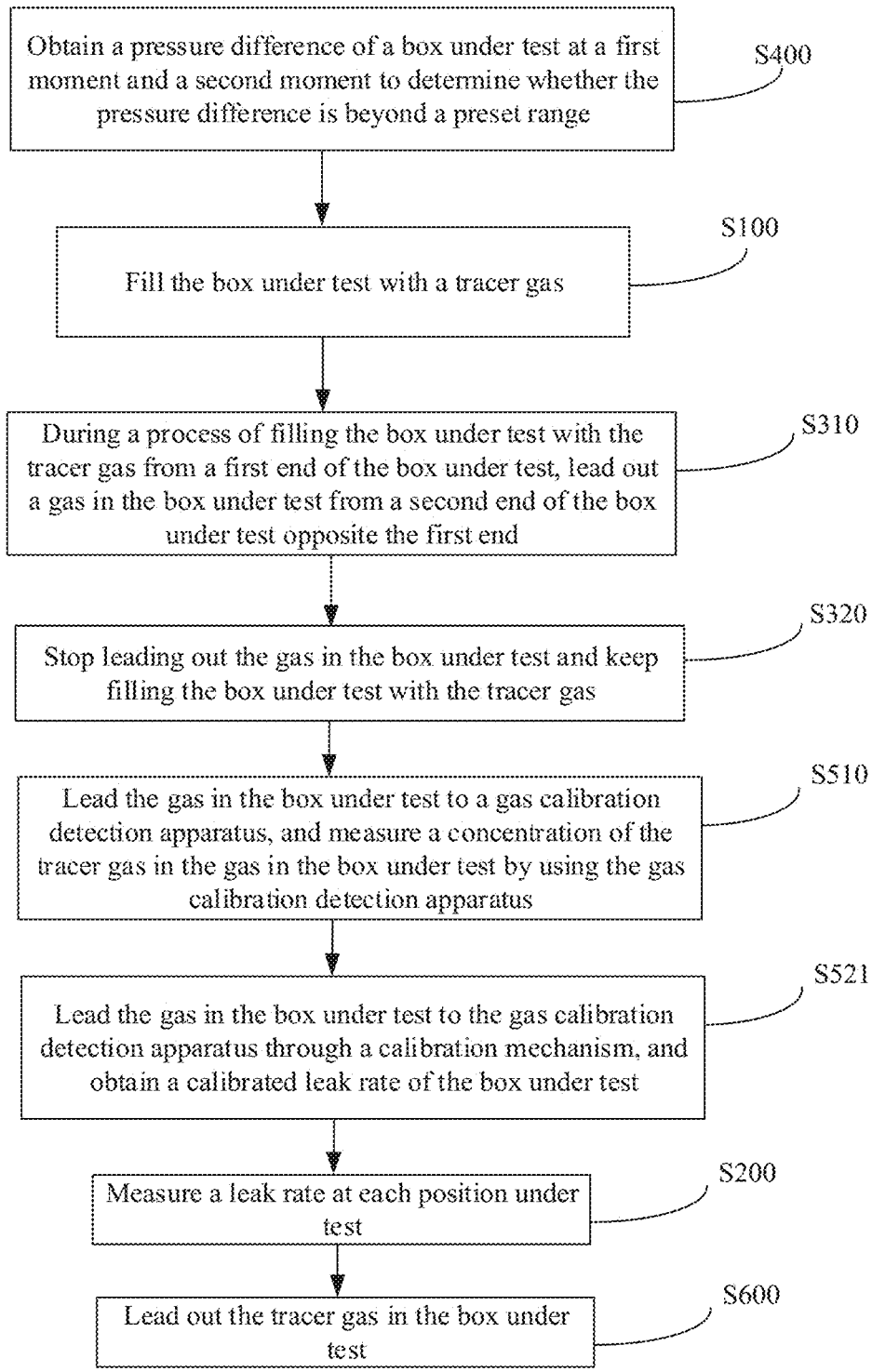
FIG. 17 is a flowchart of a method for box leak detection according to some embodiments of this application.

In some embodiments, the gas calibration detection apparatus 60 and the gas detection apparatus 20 are independent detection apparatuses. The gas calibration detection apparatus 60 communicates with the calibration mechanism 70 of the corresponding position under test 11 for obtaining a calibrated leak rate corresponding to the position under test 11. The gas detection apparatus 20 communicates with the gas suction port 311 of the leak detection tool 30 of the corresponding position under test 11 for measuring a leak rate at the position under test 11. As shown in FIG. 17, in some embodiments, the method for box leak detection further includes the following step.

Step S600: After leak rates of various positions under test 11 are measured, lead out a tracer gas in the box under test 10.

After leak detection of the box under test 10 is completed, the tracer gas in the box under test 10 is led out, preventing the tracer gas from contaminating an internal environment of the box under test 10 and affecting battery performance of a battery cell.

Figure 18:
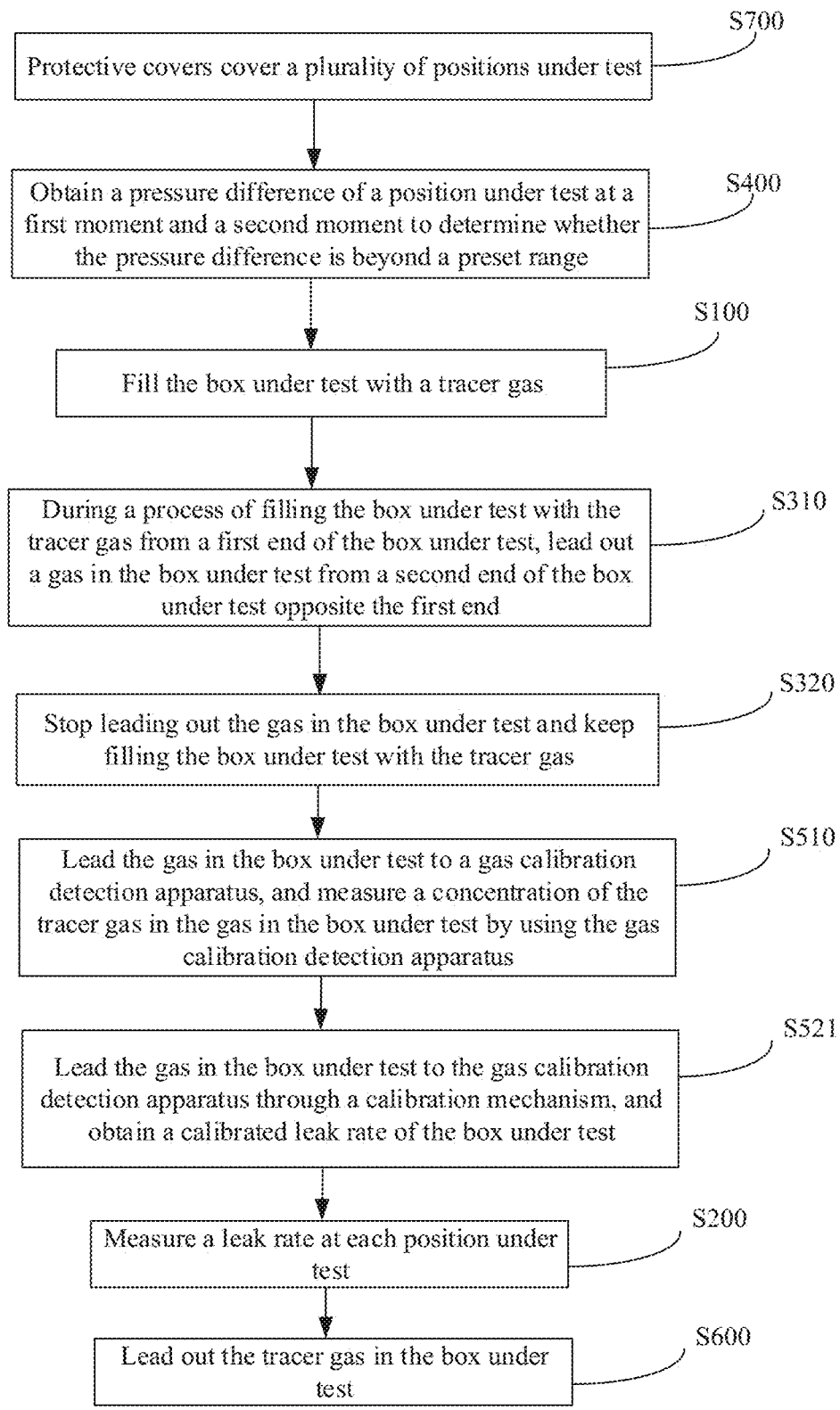
FIG. 18 is a flowchart of a method for box leak detection according to still some other embodiments of this application.

As shown in FIG. 18, in some embodiments, the method for box leak detection further includes the following step.

Step S700: Before the box under test 10 is filled with the tracer gas, cover a plurality of positions under test 11 with protective covers, so that the tracer gas is able to leak from the plurality of positions under test 11 into the protective covers. The protective covers cover the plurality of positions under test 11, which can create a clean and stable detection environment, minimize influence of an external gas flow on a detection result, and improve detection accuracy.

Figure 19:
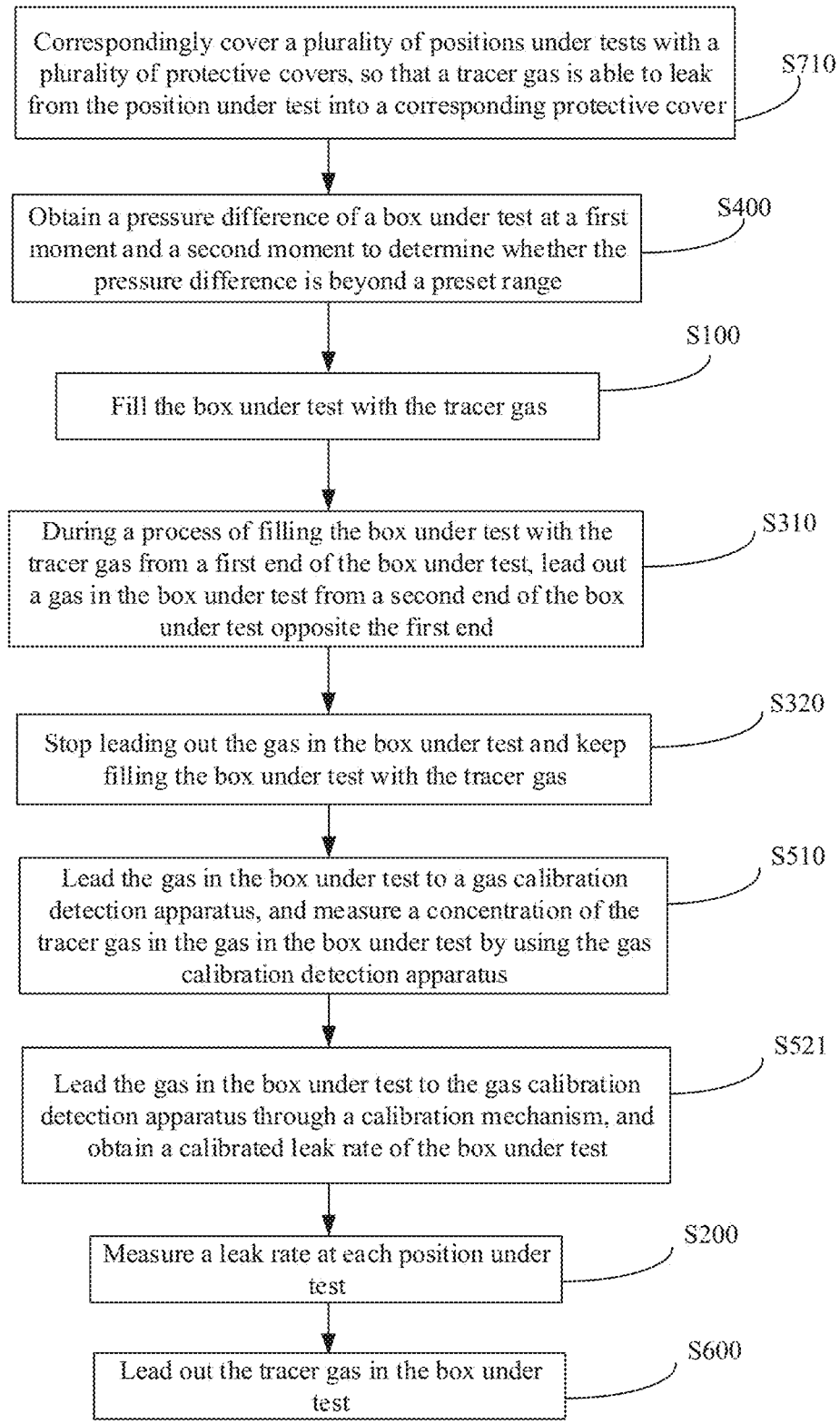
FIG. 19 is a flowchart of a method for box leak detection according to yet some other embodiments of this application.

This avoids mutual interference of the tracer gases leaked from various positions under test 11 to affect a leak detection result. As shown in FIG. 19, in some embodiments, step S700 includes the following step.

Step S710: Correspondingly cover the plurality of positions under test 11 with a plurality of protective covers, so that the tracer gas is able to leak from the position under test 11 into a corresponding protective cover.

By using a protective cover to cover a corresponding position under test 11, leaked tracer gas can enter a corresponding protective cover, which creates a clean and stable detection environment for the corresponding position under test 11, minimizing influence of an external gas flow on a detection result and improving detection accuracy.

A battery box is generally provided with a pressure relief mechanism, and the pressure relief mechanism is configured to be actuated when internal pressure or temperature in the box reaches a threshold, to release the internal pressure in the box. The pressure relief mechanism may be specifically in a form of an explosion-proof valve, a rupture disk, a gas valve, a pressure relief valve, a safety valve, or the like, and may specifically use a pressure sensitive or temperature sensitive component or structure. To be specific, when internal pressure or temperature in the battery reaches a predetermined threshold, the pressure relief mechanism performs an action or a weak structure provided in the pressure relief mechanism is destroyed, thereby forming an opening or channel for relieving the internal pressure or temperature. "Actuate" means that the pressure relief mechanism implements an action or is activated to a specified state, so that the internal pressure and temperature in the battery can be relieved. The action implemented by the pressure relief mechanism may include but is not limited to, for example, cracking, breaking, tearing, or opening at least part of the pressure relief mechanism. When the pressure relief mechanism is actuated, high-pressure and high-temperature substances inside the battery are released from an actuated part as emissions. In this way, the battery cell can release pressure and temperature in the case of controllable pressure or temperature, thereby avoiding potential and more serious accidents.

Figure 20:
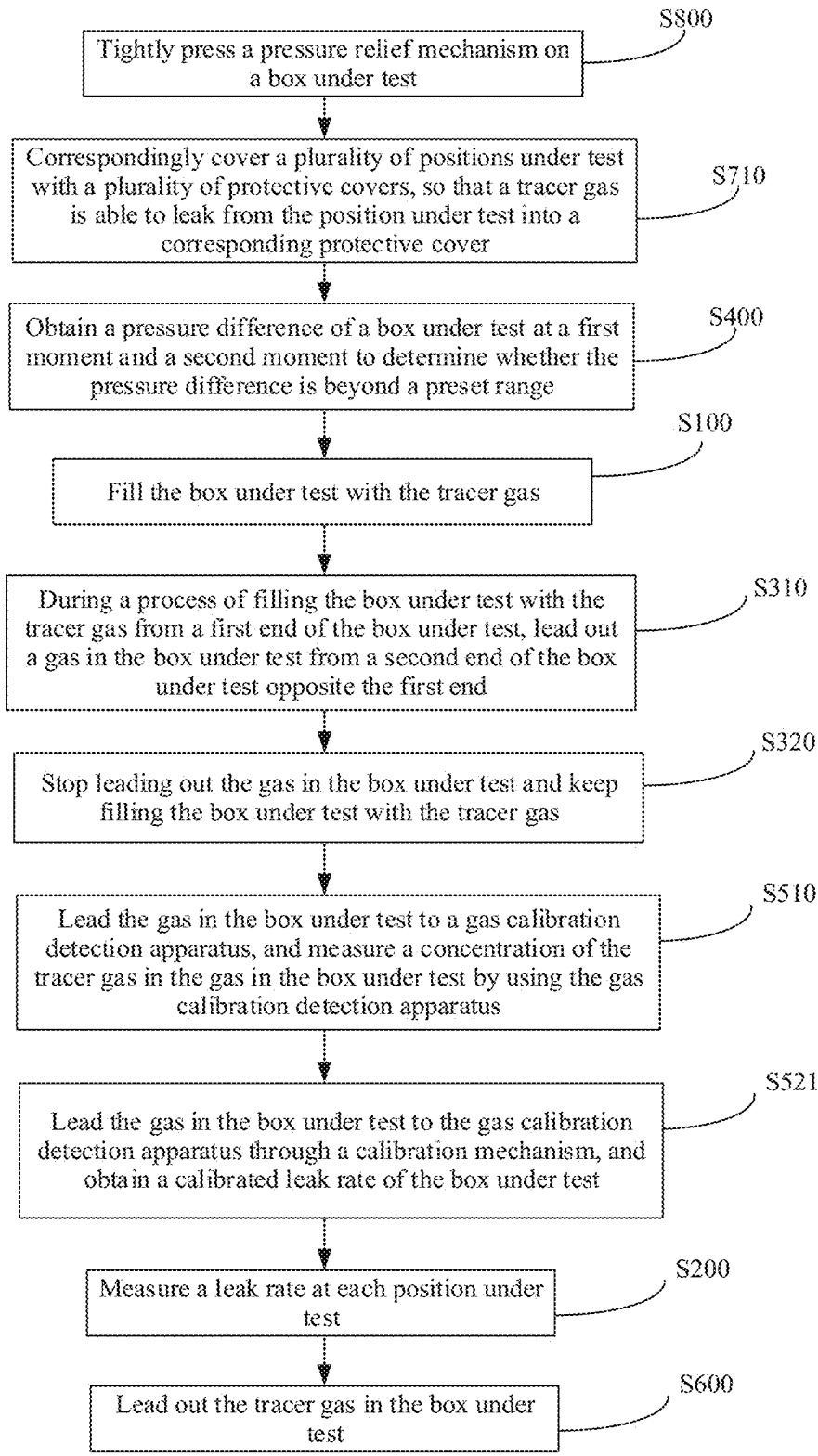
FIG. 20 is a flowchart of a method for box leak detection according to some other embodiments of this application.

Therefore, as shown in FIG. 20, in some embodiments, the method for box leak detection further includes the following step.

Step S800: Before the box under test 10 is filled with a tracer gas, tightly press a pressure relief mechanism on the box under test 10 to prevent the pressure relief mechanism from being actuated when pressure in the box under test 10 reaches a threshold. This avoids the pressure relief mechanism becoming one of the leak positions to affect accuracy of measuring a leak rate at the position under test 11 of the box under test 10.

Because the battery box also has other positions that require low sealing performance, such as a position for installing a connector (for leading out electrical energy inside the battery), before the box under test 10 is filled with the tracer gas, the position for installing the connector is blocked to avoid the tracer gas being leaked from the position for installing the connector to affect a detection result.

Figure 21:
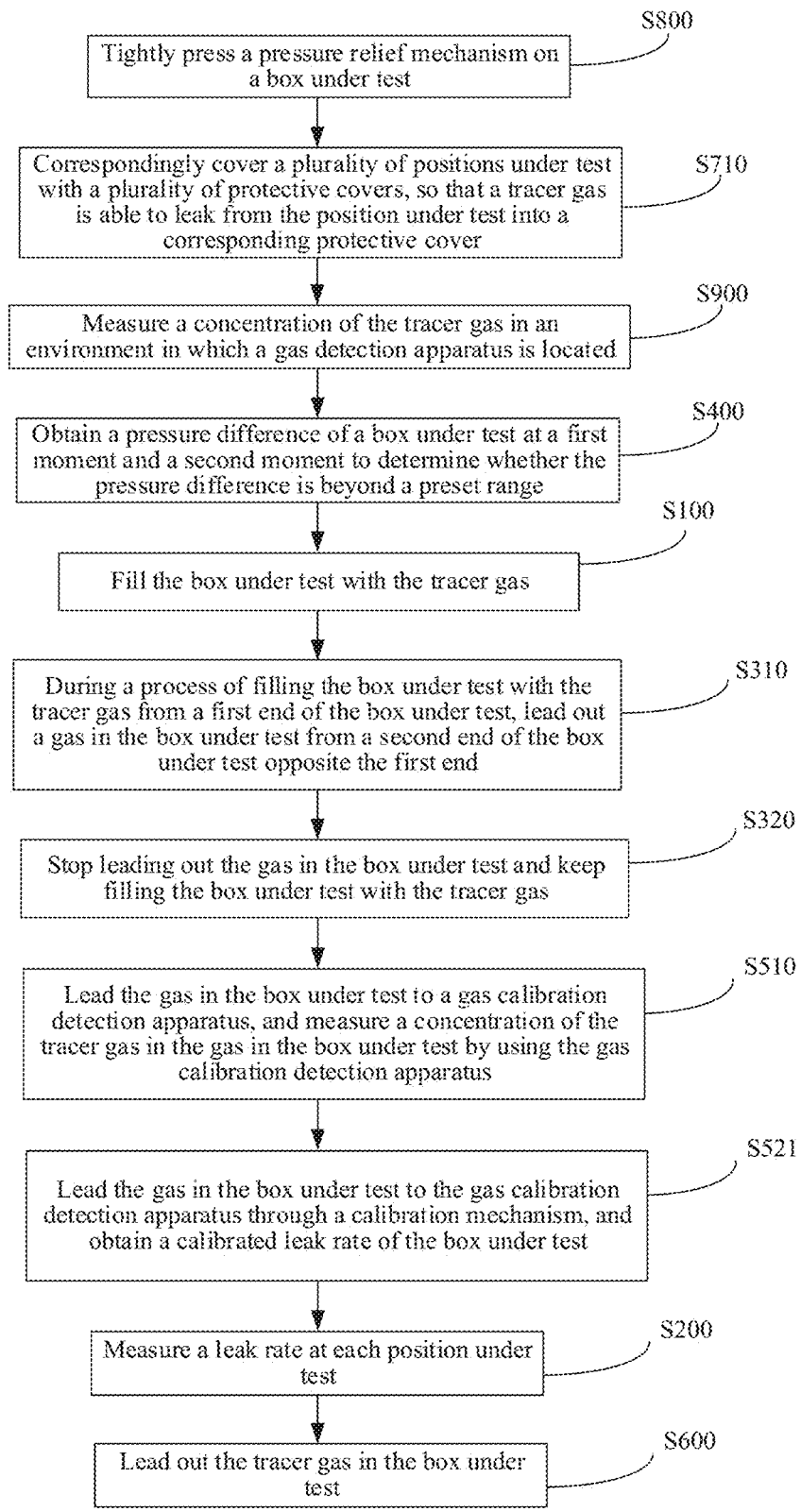
FIG. 21 is a flowchart of a method for box leak detection according to some other embodiments of this application.

Before leak detection is performed, if an environment in which the gas detection apparatus 20 is located has a tracer gas that is not leaked from the position under test 11, a resulting concentration, measured by the gas detection apparatus 20, of a tracer gas leaked from the position under test 11 is affected, resulting in a high measured leak rate. Therefore, as shown in FIG. 21, in some embodiments, the method for box leak detection further includes the following step.

Step S900: Before the box under test 10 is filled with a tracer gas, measure a concentration of a tracer gas in an environment in which the gas detection apparatus 20 is located. This avoids presence of a background tracer gas in the environment in which the gas detection apparatus 20 is located to cause high concentration of the tracer gas measured by the gas detection apparatus 20 and a high leak rate at a corresponding position under test 11.

When measuring the concentration of the tracer gas in the environment in which the gas detection apparatus 20 is located, a plurality of gas detection apparatuses 20 can be used for parallel testing, and test points are arranged in a corresponding to-be-tested environment in advance. The gas detection apparatus 20 is activated when the gas in the box under test 10 is started to be exhausted, to monitor the concentration of the tracer gas in the environment, which can effectively monitor concentration of the background tracer gas in the environment in which the gas detection apparatus 20 is located to avoid a large test value due to an excessively high background concentration. If presence of the tracer gas is detected in the environment in which the gas detection apparatus 20 is located when measurement of a leak rate at the position under test 1 starts, an exhaust system can be used to remove the escaped tracer gas in a timely manner.

It should be noted that the concentration of the tracer gas in the environment in which the gas detection apparatus 20 (gas detection apparatus 20 for measuring the concentration of the tracer gas leaked from the position under test 11) is located may be measured by using a separate detection apparatus, or may be measured by using a machine detection apparatus that is going to be placed in the environment.

The execution order between step S900, step S70) (or step S710), and step S800 is not limited in this application. For example, step S900 is performed before step S700 (or step S710), and then step S800 is performed; or step S800 is performed before step S700 (or step S710), and then step S900 is performed; or step S700 (or step S710) is performed before step S800, and then step S900 is performed.

The foregoing embodiments are merely preferred embodiments, and are not intended to limit this application. For a person skilled in the art, this application may have various changes and variations. Any modification, equivalent replacement, and improvement made without departing from the spirit and principle of this application shall fall within the protection scope of this application.

The invention claimed is:

1. A method for box leak detection, comprising:
   obtaining a pressure difference of a box under test at a first moment and a second moment, and determining that the pressure difference is within a preset pressure range, wherein the box under test is a battery box, one or more battery cells are contained in the box under test, and the box under test has a plurality of positions under test;
   filling a box under test with a tracer gas;
   leading out a gas in the box under test during filling the box under test with the tracer gas for a predetermined period of time;
   stopping leading out the gas in the box under test and continuing filling the box under test with the tracer gas;
   obtaining a concentration of the tracer gas in the box under test, and determining that the concentration of the tracer gas is within a preset concentration range;
   obtaining a calibrated leak rate at each of the positions under test;
   measuring a leak rate at each of the positions under test; and
   comparing the leak rate with the calibrated leak rate for each of the positions under test to determine whether each of the positions meets a preset sealing requirement.

2. The method for box leak detection according to claim 1, wherein the method for box leak detection further comprises:
   after the concentration reaches the preset range, measuring a concentration of the tracer gas at each of the positions under test to obtain the leak rate at each of the positions under test.

3. The method for box leak detection according to claim 2, wherein the measuring a concentration of the tracer gas in the box under test comprises:
   leading a gas in the box under test to a gas calibration detector, and measuring the concentration of the tracer gas in the gas in the box under test by using the gas calibration detector.

4. The method for box leak detection according to claim 1, wherein the obtaining a calibrated leak rate at each of the positions under test comprises:
   leading out the gas in the box under test to a gas calibration detector through a calibration mechanism, and after the concentration of the tracer gas in the box under test reaches the preset range, obtaining the calibrated leak rate at each of the positions under test.

5. The method for box leak detection according to claim 1, wherein the leading out the gas in the box under test during filling the box under test with the tracer gas comprises:
   during filling the box under test with the tracer gas from a gas-filling port at a first end of the box under test, leading out the gas in the box under test from a gas outlet at a second end of the box under test opposite the first end, and a central axis of the gas-filling port and a central axis of the gas outlet are arranged in parallel.

6. The method for box leak detection according to claim 1, wherein the method for box leak detection further comprises:
   after the measuring a leak rate at each of the positions under test, leading out the tracer gas in the box under test.

7. The method for box leak detection according to claim 1, wherein the method for box leak detection further comprises:
   before filling the box under test with the tracer gas, covering the plurality of positions under test with protective covers, so that the tracer gas is able to leak from the plurality of positions under test into the protective covers.

8. The method for box leak detection according to claim 7, wherein the covering the plurality of positions under test with protective covers, so that the tracer gas is able to leak from the plurality of positions under test into the protective covers comprises:
   correspondingly covering the plurality of positions under test with a plurality of such protective covers, so that the tracer gas is able to leak from the positions under test into a corresponding protective cover.

9. The method for box leak detection according to claim 1, wherein the box under test comprises a pressure relief mechanism, and the method further comprises:
   before the box under test is filled with a tracer gas, pressing the pressure relief mechanism to prevent the pressure relief mechanism from being actuated during the leak detection.

10. The method for box leak detection according to claim 1, further comprising:
    before the box under test is filled with the tracer gas, measuring a background concentration of the tracer gas in an environment close to each one of the positions.

11. A leak detection system, configured to perform leak detection on a plurality of positions under test of a box under test, wherein the box under test is a battery box, and one or more battery cells are contained in the box under test, wherein the leak detection system comprises:
- a gas-filler configured to:
  - fill the box under test with a tracer gas when a pressure difference of the box under test measured at a first moment and a second moment is within a preset pressure range;
  - lead out a gas in the box under test during filling the box under test with the tracer gas for a predetermined period of time; and
  - stop leading out the gas in the box under test and continue filling the box under test with the tracer gas;
- a gas detector, wherein the gas detector is provided corresponding to one of the positions under test, and the gas detector is configured to:
  - obtain a concentration of the tracer gas in the box under test, and determine that the concentration of the tracer gas is within a preset concentration range,
  - measure a leak rate at the corresponding one of the positions under test, and
- a gas calibration detector configured to:
  - obtain a calibrated leak rate at each of the positions under test.

12. The leak detection system according to claim 11, wherein the leak detection system further comprises a plurality of leak detection tools, wherein one of the leak detection tools is provided corresponding to one of the positions under test, and the gas detector is installed at the one of the positions under test by using the one of leak detection tools.

13. The leak detection system according to claim 12, wherein each one of the leak detection tools further comprises a body and two rollers, wherein each one of the two rollers is rotatably provided on the body, and the body is provided with a gas suction port, wherein a gas suction pipe is provided between the two rollers, and the two rollers define a position for gas suction, wherein the gas suction pipe is in gas communication with the gas suction port, and the gas detector is installed on the leak detection tool and in gas communication with the gas suction pipe through the gas suction port, such that a gas leaked from the position under test can reach the gas detector through the gas suction pipe and the gas suction port, wherein the two rollers are in contact with a surface of the position and configured to drive the leak detection tool to move along the surface and change a position relative to the gas suction pipe.

14. The leak detection system according to claim 13, wherein the leak detection tool is configured to maintain a constant distance between the surface and the gas detector.

15. The leak detection system according to claim 11, wherein the leak detection system further comprises a negative pressure structure, to lead a gas at the one of the positions under test to the gas detector.

16. The leak detection system according to claim 11, wherein the gas detector comprises a gas sensor.

17. The leak detection system according to claim 11, wherein the leak detection system further comprises protective covers, wherein the protective covers are configured to cover the plurality of positions under test, so that the tracer gas is able to leak from the plurality of positions under test into the protective covers.

18. The leak detection system according to claim 17, wherein the protective cover is provided in plurality, and the positions under test are provided corresponding to the protective covers, so that the gas detector measures the leak rate at the corresponding one of the positions under test through the protective cover, and the tracer gas is able to leak from the corresponding one of the positions under test into a corresponding protective cover.

* * * * *